(12) United States Patent
Lu et al.

(10) Patent No.: US 12,213,139 B2
(45) Date of Patent: **\*Jan. 28, 2025**

(54) INFORMATION TRANSMISSION METHOD, APPARATUS AND SYSTEM

(71) Applicant: ZTE CORPORATION, Shenzhen (CN)

(72) Inventors: Zhaohua Lu, Shenzhen (CN); Kun Liu, Shenzhen (CN); Yijian Chen, Shenzhen (CN); Peng Hao, Shenzhen (CN); Guanghui Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,494

(22) Filed: Nov. 1, 2023

(65) Prior Publication Data

US 2024/0064742 A1    Feb. 22, 2024

Related U.S. Application Data

(63) Continuation of application No. 17/901,733, filed on Sep. 1, 2022, now Pat. No. 11,838,912, which is a
(Continued)

(30) Foreign Application Priority Data

Mar. 22, 2016   (CN) .......................... 201610165992.2

(51) Int. Cl.
*H04W 72/20*    (2023.01)
*H04L 5/00*     (2006.01)
(Continued)

(52) U.S. Cl.
CPC ........... *H04W 72/20* (2023.01); *H04L 5/0012* (2013.01); *H04L 5/0048* (2013.01);
(Continued)

(58) Field of Classification Search
None
See application file for complete search history.

(56) References Cited

U.S. PATENT DOCUMENTS

| | | |
|---|---|---|
| 2012/0076090 A1 | 3/2012 | Kim et al. |
| 2012/0093115 A1* | 4/2012 | Guan ................... H04L 5/0007 |
| | | 370/329 |

(Continued)

FOREIGN PATENT DOCUMENTS

| | | |
|---|---|---|
| CN | 102356575 A | 2/2012 |
| CN | 103828318 A | 5/2014 |

(Continued)

OTHER PUBLICATIONS

International Search Report dated May 31, 2017 for International Application No. PCT/CN2017/076185, 5 pages.
(Continued)

*Primary Examiner* — Saumit Shah
(74) *Attorney, Agent, or Firm* — Morgan, Lewis & Bockius LLP

(57) ABSTRACT

Provided is an information transmission method, apparatus and system. The information transmission method includes: obtaining, by a first communication node, a control channel description list which includes description information of N control channels, where N is a positive integer and the description information of each of the control channels includes one or more of: control channel configuration information, reference signal configuration information, link resource configuration information, operating bandwidth configuration information, puncturing configuration information, frequency hopping configuration formation, transmission time interval length configuration information, power control configuration information and beam configuration information; and sending, by the first communication (Continued)

node, the control channel description list to a second communication node.

18 Claims, 13 Drawing Sheets

Related U.S. Application Data continuation of application No. 16/088,034, filed as application No. PCT/CN2017/076186 on Mar. 9, 2017, now Pat. No. 11,470,580.

(51) Int. Cl.
*H04W 56/00* (2009.01)
*H04W 72/0453* (2023.01)
*H04W 72/1263* (2023.01)

(52) U.S. Cl.
CPC ......... *H04L 5/0053* (2013.01); *H04W 56/001* (2013.01); *H04W 72/0453* (2013.01); *H04W 72/1263* (2013.01)

(56) References Cited

U.S. PATENT DOCUMENTS

| | | |
|---|---|---|
| 2013/0286967 A1 | 10/2013 | Ji |
| 2014/0044088 A1 | 2/2014 | Nogami |
| 2015/0049725 A1 | 2/2015 | Kim et al. |
| 2015/0373695 A1 | 12/2015 | Skärby |
| 2016/0301505 A1 | 10/2016 | Furuskog |
| 2016/0338018 A1 | 11/2016 | Awad |
| 2017/0195088 A1 | 7/2017 | Uchino |
| 2017/0331577 A1 | 11/2017 | Parkvall et al. |
| 2018/0041857 A1 | 2/2018 | Ouchi et al. |
| 2018/0206215 A1 | 7/2018 | Frenne et al. |
| 2018/0332576 A1 | 11/2018 | Oh et al. |
| 2020/0136781 A1 | 4/2020 | Yi |

FOREIGN PATENT DOCUMENTS

| | | |
|---|---|---|
| CN | 104348601 A | 2/2015 |
| CN | 105099639 A | 11/2015 |
| CN | 105379161 A | 3/2016 |
| EP | 3288210 A1 | 2/2018 |
| WO | WO 2012/088444 A1 | 6/2012 |
| WO | WO 2014/124679 A1 | 8/2014 |

OTHER PUBLICATIONS

Written Opinion of the International Searching Authority dated May 31, 2017 for International Application No. PCT/CN2017/076186, 3 pages.
Extended European Search Report of corresponding Application No. 17769317.3 -6 pages, Oct. 9, 2019.
First Office Action received in CN Application No. 201610165992. 2, mailed Mar. 30, 2021.
First Search Report received in CN Application No. 201610165992. 2, mailed Mar. 19, 2021.

\* cited by examiner

A-type control channel

B-type control channel

C-type control channel

INFORMATION TRANSMISSION METHOD, APPARATUS AND SYSTEM

CROSS-REFERENCE TO RELATED APPLICATIONS

This is a continuation of U.S. patent application Ser. No. 17/901,733, filed on Sep. 1, 2022, now U.S. Pat. No. 11,838,912, which is a continuation of U.S. patent application Ser. No. 16/088,034, filed on Sep. 24, 2018, now U.S. Pat. No. 11,470,580, which is a National Stage Application, filed under 35 U.S.C. 371, of International Patent Application No. PCT/CN2017/076186, filed on Mar. 9, 2017, which claims priority to Chinese patent application No. 201610165992.2 filed on Mar. 22, 2016, contents of which are incorporated herein by reference in their entireties.

TECHNICAL FIELD

The present application relates to, but is not limited to, the field of wireless communications and, in particular, to an information transmission method, apparatus and system.

BACKGROUND

The wireless communication technology is developing and the user requirements for communications are increasing. The higher, faster and newer communications are in demand. 5th generation (5G) mobile communication technology has already become a trend of development of the future network.

An existing Long Term Evolution (LTE) or LTE-Advanced (LTE-A) system performs data transmission based on dynamic scheduling of each sub-frame; that is, each sub-frame may transmit different control channels. However, the design of LTE/LTE-A standard control channels is single and of poor flexibility. When services to be supported have greatly different requirements on delay, reliability and the like, the system efficiency is significantly reduced. With the rise of intelligent terminals and the enrichment of wireless data application services, data users in a wireless communication system have increased substantially and data content is no longer limited to a traditional text or image. In the future, users have increasing requirements on multimedia services such as high-definition videos and mobile TVs, resulting in an explosive growth of wireless network traffic. The 5G technology is designed to tackle challenges brought by differentiated performance indicators in various application scenarios. Performance challenges in different application scenarios are different. A user experience rate, a traffic density, delay, energy efficiency and the number of connections may become challenging indicators in various scenarios. From perspectives of service requirements and challenges in main application scenarios of the mobile Internet and the Internet of Things, four main 5G technical scenarios may be summarized as: a continuous wide-area coverage scenario, a high-capacity hot-spot scenario, a low-power-consumption high-connection-density scenario and a low-delay high-reliability scenario.

Considering that the 5G technology needs to support various applications with different Quality of Service (QoS) requirements, the design of control channels in the existing LTE technology cannot well meet the requirement of the 5G system on design flexibility, and control channels in the related art has poor scalability and adaptability. This will seriously decrease system spectrum efficiency and increase system maintenance costs. In addition, a terminal device which supports multiple services may only determine the support situation of a current system for different services through blind detection, which greatly affects system performance, increases power consumption and control overhead of the terminal device. Moreover, the system has poor "forward compatibility".

SUMMARY

The following is a summary of the subject matter described in detail in the present application. This summary is not intended to limit the scope of the claims.

Embodiments of the present disclosure provide an information transmission method, apparatus and system, in which the standard scheme of control channels in a 5G system is rationally designed.

In a first aspect, an embodiment of the present disclosure provides an information transmission method. The method includes the steps described below.

A first communication node generates or receives a control channel description list. The control channel description list includes description information of N control channels and the description information of the N control channels is used for describing N different types of control channels, and N is a positive integer.

The first communication node sends the control channel description list to a second communication node.

In a first possible implementation mode of the first aspect, the description information of the control channels may be determined according to types of the control channels.

In a second possible implementation mode of the first aspect, the description information of the control channels may include one or more of: control channel configuration information, reference signal configuration information, link resource configuration information, operating bandwidth configuration information, puncturing configuration information, frequency hopping configuration formation, transmission time interval length configuration information, power control configuration information or beam configuration information.

On the basis of the second possible implementation mode of the first aspect, in a third possible implementation mode, the control channel configuration information may include one or more of: a resource location, a subcarrier spacing, a waveform, a transmission period, a valid time length, a resource mapping manner, a spreading code word, a number of information bits, a modulation and coding mode, a code rate, a multi-antenna transmission mode, a number of repetitions or a repetition period. The resource location includes at least one of: a starting resource location or an ending resource location.

On the basis of the third possible implementation mode of the first aspect, in a fourth possible implementation mode, the resource location may refer to a relative position of each of the control channels in a transmission time interval corresponding to the each of the control channels.

On the basis of the second possible implementation mode of the first aspect, in a fifth possible implementation mode, the control channel configuration information may include one or more of: synchronization channel configuration information, broadcast channel configuration information, access parameter configuration information, resource allocation channel configuration information or feedback channel configuration information.

On the basis of the fifth possible implementation mode of the first aspect, in a sixth possible implementation mode, the synchronization channel configuration information may include one or more of: a resource location, a transmission period, a resource mapping manner or a synchronization sequence.

Alternatively, the broadcast channel configuration information may include one or more of: the resource location, the transmission period, the resource mapping manner, a valid information length or an information type.

Alternatively, the access parameter configuration information may include one or more of: the resource location, the transmission period, the resource mapping manner or an access sequence set.

Alternatively, the resource allocation channel configuration information may be used for instructing a frequency domain range of schedulable data resources by each of the control channels.

The feedback channel configuration information may include one or more of: a feedback interval for an acknowledgement or a negative acknowledgement (ACK/NACK), or a channel state information feedback mode.

On the basis of the second possible implementation mode of the first aspect, in a seventh possible implementation mode, the reference signal configuration information may include one or more of: a resource location, a sequence set or a measurement window.

On the basis of the seventh possible implementation mode of the first aspect, in an eighth possible implementation mode, a reference signal configured with the reference signal configuration information may be used for demodulating each of the control channels.

Alternatively, the reference signal configured with the reference signal configuration information may be used for measuring channel state information.

Alternatively, the reference signal configured with the reference signal configuration information may be used for beam direction training.

On the basis of the second possible implementation mode of the first aspect, in a ninth possible implementation mode, the link resource configuration information may include one or more of: a number of each of the control channels in a transmission time interval corresponding to the each of the control channels, or a transmission direction of each of the control channels.

On the basis of the ninth possible implementation mode of the first aspect, in a tenth possible implementation mode, in the transmission time interval, each of the control channels may include at least one of: a downlink control channel or an uplink control channel.

On the basis of the second possible implementation mode of the first aspect, in an eleventh possible implementation mode, the operating bandwidth configuration information may be used for instructing a frequency domain resource range scheduled by each of the control channels.

On the basis of the eleventh possible implementation mode of the first aspect, in a twelfth possible implementation mode, the frequency domain resource range scheduled by each of the control channels may be greater than or equal to a frequency domain resource range used for transmitting the each of the control channels.

On the basis of the second possible implementation mode of the first aspect, in a thirteenth possible implementation mode, the transmission time interval length configuration information may include a time length corresponding to each of the control channels.

On the basis of the thirteenth possible implementation mode of the first aspect, in a fourteenth possible implementation mode, a transmission time interval length is configured in basic resource units according to the transmission time interval length configuration information.

On the basis of the second possible implementation mode of the first aspect, in a fifteenth possible implementation mode, the puncturing configuration information may be used for instructing the second communication node whether to decode with information on resources used for transmitting X control channels when data transmission resources used by the second communication node include resources for transmitting Y control channels, where the X control channels belong to the Y control channels, X is a positive integer less than or equal to N, and Y is a positive integer greater than or equal to X and less than or equal to N.

Alternatively, the frequency hopping configuration information may include one or more of: frequency hopping resources, a frequency hopping interval in frequency domain or a frequency hopping interval in time domain.

Alternatively, the power control configuration information may include one or more of: a downlink transmit power control parameter value, an uplink transmit power control parameter value or an uplink power control mode.

Alternatively, the beam configuration information may include one or more of: a number of transmitting beams, a number of receiving beams, a switching period of the transmitting beams, a switching period of the receiving beams or a beam training mode.

On the basis of the first aspect or any one of the first to fifteenth possible implementation modes of the first aspect, in a sixteenth possible implementation mode, the control channel description list may further include transmission period information of the control channel description list.

On the basis of the first aspect or any one of the first to fifteenth possible implementation modes of the first aspect, in a seventeenth possible implementation mode, frequency domain resources scheduled by any two of the control channels in the description information of the N control channels may be completely different or partially overlapping.

On the basis of the first aspect or any one of the first to fifteenth possible implementation modes of the first aspect, in an eighteenth possible implementation mode, the control channel description list may further include type information of M types of terminal devices, where M is a positive integer.

On the basis of the eighteenth possible implementation mode of the first aspect, in a nineteenth possible implementation mode, a correspondence between the M types of terminal devices and the description information of the N control channels may be that each type of terminal device corresponds to description information of one or more of the control channels.

On the basis of the first aspect or any one of the first to fifteenth possible implementation modes of the first aspect, in a twentieth possible implementation mode, the first communication node may send the control channel description list at a carrier frequency different from a carrier frequency used for sending the N control channels; or the control channels may be sent by the first communication node or another communication node.

On the basis of the first aspect or any one of the first to fifteenth possible implementation modes of the first aspect, in a twenty-first possible implementation mode, the information transmission method may further include the step described below.

The first communication node sends control channel type instruction information to the second communication node. The control channel type instruction information is used for instructing the second communication node to use description information of n specified control channels in the description information of the N control channels to process at least one of a control channel or a data channel, where n is a positive integer less than or equal to N.

On the basis of the first aspect or any one of the first to fifteenth possible implementation modes of the first aspect, in a twenty-second possible implementation mode, before the first communication node sends the control channel description list to the second communication node, the information transmission method may further include the step described below.

The first communications node receives a random access signal sent by the second communications node.

Alternatively, the first communication node receives a request message for the control channel description list sent by the second communication node.

On the basis of the first aspect or any one of the first to fifteenth possible implementation modes of the first aspect, in a twenty-third possible implementation mode, before the first communication node sends the control channel description list to the second communication node, the information transmission method may further include the step described below.

The first communication node obtains resources for sending the control channel description list in a contention manner.

On the basis of the first aspect or any one of the first to fifteenth possible implementation modes of the first aspect, in a twenty-fourth possible implementation mode, before the first communication node sends the control channel description list to the second communication node, the information transmission method may further include the step described below.

The first communication node sends a first notification message to the second communication node with a signaling, where the first notification message instructs the first communication node to determine to send the control channel description list.

On the basis of the twenty-fourth possible implementation mode of the first aspect, in a twenty-fifth possible implementation mode, the signaling is carried in a physical broadcasting control channel.

On the basis of the first aspect or any one of the first to fifteenth possible implementation modes of the first aspect, in a twenty-sixth possible implementation mode, after the first communication node sends the control channel description list to the second communication node, the information transmission method may further include the step described below.

The first communication node sends a second notification message to the second communication node with a signaling, where the second notification message instructs whether the control channel description list is updated.

On the basis of the first aspect or any one of the first to fifteenth possible implementation modes of the first aspect, in a twenty-seventh possible implementation mode, the information transmission method may further include the step described below.

The first communication node sends a synchronization channel to the second communication node, where resources used by the first communication node for sending the control channel description list are the same as resources used by the first communication node for sending the synchronization channel.

In a second aspect, an embodiment of the present disclosure provides an information transmission method. The method includes the steps described below.

A second communication node receives a control channel description list sent by a first communication node. The control channel description list includes description information of N control channels and the description information of the N control channels is used for describing N different types of control channels, and N is a positive integer.

The second communication node processes at least one of a control channel or a data channel according to the control channel description list.

In a first possible implementation mode of the second aspect, the description information of the control channels may be determined according to types of the control channels.

In a second possible implementation mode of the second aspect, the description information of the control channels may include one or more of: control channel configuration information, reference signal configuration information, link resource configuration information, operating bandwidth configuration information, puncturing configuration information, frequency hopping configuration formation, transmission time interval length configuration information, power control configuration information or beam configuration information.

On the basis of the second possible implementation mode of the second aspect, in a third possible implementation mode, the control channel configuration information may include one or more of: a resource location, a subcarrier spacing, a waveform, a transmission period, a valid time length, a resource mapping manner, a spreading code word, a number of information bits, a modulation and coding mode, a code rate, a multi-antenna transmission mode, a number of repetitions or a repetition period. The resource location may include at least one of: a starting resource location or an ending resource location.

Alternatively, the control channel configuration information may include one or more of: synchronization channel configuration information, broadcast channel configuration information, access parameter configuration information, resource allocation channel configuration information or feedback channel configuration information.

On the basis of the second possible implementation mode of the second aspect, in a fourth possible implementation mode, the synchronization channel configuration information may include one or more of: a resource location, a transmission period, a resource mapping manner or a synchronization sequence.

Alternatively, the broadcast channel configuration information may include one or more of: the resource location, the transmission period, the resource mapping manner, a valid information length or an information type.

Alternatively, the access parameter configuration information may include one or more of: the resource location, the transmission period, the resource mapping manner or an access sequence set.

Alternatively, the resource allocation channel configuration information may be used for instructing a frequency domain range of schedulable data resources by each of the control channels.

Alternatively, the feedback channel configuration information may include one or more of: a feedback interval for an acknowledgement or a negative acknowledgement (ACK/NACK), or a channel state information feedback mode.

On the basis of the second possible implementation mode of the second aspect, in a fifth possible implementation mode, the reference signal configuration information may include one or more of: a resource location, a sequence set or a measurement window.

Alternatively, the link resource configuration information may include one or more of: a number of each of the control channels in a transmission time interval or a transmission direction of each of the control channels.

Alternatively, the operating bandwidth configuration information may be used for instructing a frequency domain resource range scheduled by each of the control channels, where the frequency domain resource range scheduled by each of the control channels is greater than or equal to a frequency domain resource range used for transmitting the each of the control channels.

Alternatively, the transmission time interval length configuration information may include a time length corresponding to each of the control channels.

Alternatively, the puncturing configuration information may be used for instructing the second communication node whether to decode with information on resources used for transmitting X control channels when data transmission resources used by the second communication node include resources for transmitting Y control channels, where the X control channels belong to the Y control channels, X is a positive integer less than or equal to N, and Y is a positive integer greater than or equal to X and less than or equal to N.

Alternatively, the frequency hopping configuration information may include one or more of: frequency hopping resources, a frequency hopping interval in frequency domain or a frequency hopping interval in time domain.

Alternatively, the power control configuration information may include one or more of: a downlink transmit power control parameter value, an uplink transmit power control parameter value or an uplink power control mode.

Alternatively, the beam configuration information may include one or more of: a number of transmitting beams, a number of receiving beams, a switching period of the transmitting beams, a switching period of the receiving beams or a beam training mode.

On the basis of the second aspect or any one of the first to fifth possible implementation modes of the second aspect, in a sixth possible implementation mode, the control channel description list may further include transmission period information of the control channel description list.

Alternatively, the control channel description list may further include type information of M types of terminal devices, where M is a positive integer and a correspondence between the M types of terminal devices and the description information of the N control channels may be that each type of terminal device corresponds to description information of one or more of the control channels.

Alternatively, frequency domain resources scheduled by any two of the control channels in the description information of the N control channels may be completely different or partially overlapping.

On the basis of the second aspect or any one of the first to fifth possible implementation modes of the second aspect, in a seventh possible implementation mode, before the second communication node processes at least one of the control channel or the data channel according to the control channel description list, the information transmission method may further include the step described below.

The second communication node receives control channel type instruction information sent by the first communication node.

The step in which the second communication node processes at least one of a control channel or a data channel according to the control channel description list may include the step described below.

The second communication node uses description information of n specified control channels in the description information of the N control channels to process at least one of the control channel or the data channel, where n is a positive integer less than or equal to N.

On the basis of the second aspect or any one of the first to fifth possible implementation modes of the second aspect, in an eighth possible implementation mode, before the second communication node receives the control channel description list sent by the first communication node, the information transmission method may further include the step described below.

The second communications node sends a random access signal to the first communications node.

Alternatively, the second communication node sends a request message for the control channel description list to the first communication node.

Alternatively, the second communication node obtains a system operating bandwidth.

On the basis of the second aspect or any one of the first to fifth possible implementation modes of the second aspect, in a ninth possible implementation mode, before the second communication node receives the control channel description list sent by the first communication node, the information transmission method may further include the step described below.

The second communication node receives a first notification message sent by the first communication node with a signaling, where the first notification message instructs the first communication node to determine to send the control channel description list.

On the basis of the second aspect or any one of the first to fifth possible implementation modes of the second aspect, in a tenth possible implementation mode, after the second communication node receives the control channel description list sent by the first communication node, the information transmission method may further include the step described below.

The second communication node receives a second notification message sent by the first communication node with a signaling, where the second notification message instructs whether the control channel description list is updated.

On the basis of the second aspect or any one of the first to fifth possible implementation modes of the second aspect, in an eleventh possible implementation mode, the information transmission method may further include the step described below.

The second communication node receives a synchronization channel sent by the first communication node, where resources used for sending the control channel description list are the same as resources used for sending the synchronization channel.

On the basis of the second aspect or any one of the first to fifth possible implementation modes of the second aspect, in a twelfth possible implementation mode, the second communication node receiving the control channel description list belongs to a set of second communication nodes of a preset type.

On the basis of the twelfth possible implementation mode of the second aspect, in a thirteen possible implementation mode, the set of second communication nodes of the preset type is a set of second communication nodes supporting machine-type communication, or a set of second communication nodes supporting low-delay high-reliability machine-type communication, or a set of second communication nodes supporting low-rate machine-type communication, or a set of second communication nodes supporting mobile broadband.

In a third aspect, an embodiment of the present disclosure provides an information transmission apparatus, disposed in a first communication node. The apparatus includes an obtaining module and a sending module.

The obtaining module is configured to generate or receive a control channel description list. The control channel description list includes description information of N control channels and the description information of the N control channels is used for describing N different types of control channels, and N is a positive integer.

The sending module is connected to the obtaining module and configured to send the control channel description list obtained by the obtaining module to a second communication node.

In a first possible implementation mode of the third aspect, the description information of the control channels may be determined according to types of the control channels.

In a second possible implementation mode of the third aspect, the description information of the control channels may include one or more of: control channel configuration information, reference signal configuration information, link resource configuration information, operating bandwidth configuration information, puncturing configuration information, frequency hopping configuration formation, transmission time interval length configuration information, power control configuration information or beam configuration information.

On the basis of the second possible implementation mode of the third aspect, in a third possible implementation mode, the control channel configuration information nay include one or more of: a resource location, a subcarrier spacing, a waveform, a transmission period, a valid time length, a resource mapping manner, a spreading code word, a number of information bits, a modulation and coding mode, a code rate, a multi-antenna transmission mode, a number of repetitions or a repetition period. The resource location includes at least one of: a starting resource location or an ending resource location.

Alternatively, the control channel configuration information may include one or more of: synchronization channel configuration information, broadcast channel configuration information, access parameter configuration information, resource allocation channel configuration information or feedback channel configuration information.

On the basis of the third aspect or any one of the first to third possible implementation modes of the third aspect, in a fourth possible implementation mode, the control channel description list may further include type information of M types of terminal devices, where M is a positive integer and a correspondence between the M types of terminal devices and the description information of the N control channels may be that each type of terminal device corresponds to description information of one or more of the control channels.

Alternatively, frequency domain resources scheduled by any two of the control channels in the description information of the N control channels may be completely different or partially overlapping.

On the basis of the third aspect or any one of the first to third possible implementation modes of the third aspect, in a fifth possible implementation mode, the sending module may send the control channel description list at a carrier frequency different from a carrier frequency used for sending the N control channels; or the control channels may be sent by the sending module of the first communication node or another communication node.

On the basis of the third aspect or any one of the first to third possible implementation modes of the third aspect, in a sixth possible implementation mode, the sending module may be further configured to send control channel type instruction information to the second communication node. The control channel type instruction information is used for instructing the second communication node to use description information of n specified control channels in the description information of the N control channels to process at least one of a control channel or a data channel, where n is a positive integer less than or equal to N.

On the basis of the third aspect or any one of the first to third possible implementation modes of the third aspect, in a seventh possible implementation mode, the information transmission apparatus may further include a receiving module. The receiving module is connected to the sending module and configured to receive a random access signal sent by the second communication node or receive a request message for the control channel description list sent by the second communication node before the sending module sends the control channel description list to the second communication node.

On the basis of the third aspect or any one of the first to third possible implementation modes of the third aspect, in an eighth possible implementation mode, the obtaining module may be further configured to obtain resources for sending the control channel description list in a contention manner before the sending module sends the control channel description list to the second communication node.

On the basis of the third aspect or any one of the first to third possible implementation modes of the third aspect, in a ninth possible implementation mode, the sending module may be further configured to send a first notification message to the second communication node with a signaling before the sending module sends the control channel description list to the second communication node, where the first notification message instructs the first communication node to determine to send the control channel description list.

Alternatively, the sending module may be further configured to send a second notification message to the second communication node with a signaling after the sending module sends the control channel description list to the second communication node, where the second notification message instructs whether the control channel description list is updated.

Alternatively, the sending module may be further configured to send a synchronization channel to the second communication node, where resources used by the sending module for sending the control channel description list are the same as resources used by the sending module for sending the synchronization channel.

In a fourth aspect, an embodiment of the present disclosure provides an information transmission apparatus, disposed in a second communication node. The information transmission apparatus includes a receiving module and a processing module.

The receiving module is configured to receive a control channel description list sent by a first communication node.

The control channel description list includes description information of N control channels and the description information of the N control channels is used for describing N different types of control channels, and N is a positive integer.

The processing module is connected to the receiving module and configured to process a control channel and/or a data channel according to the control channel description list received by the receiving module.

In a first possible implementation mode of the fourth aspect, the description information of the control channels may be determined according to types of the control channels.

In a second possible implementation mode of the fourth aspect, the description information of the control channels may include one or more of: control channel configuration information, reference signal configuration information, link resource configuration information, operating bandwidth configuration information, puncturing configuration information, frequency hopping configuration formation, transmission time interval length configuration information, power control configuration information or beam configuration information.

On the basis of the second possible implementation mode of the fourth aspect, in a third possible implementation mode, the control channel configuration information may include one or more of: a resource location, a subcarrier spacing, a waveform, a transmission period, a valid time length, a resource mapping manner, a spreading code word, a number of information bits, a modulation and coding mode, a code rate, a multi-antenna transmission mode, a number of repetitions or a repetition period. The resource location may include at least one of: a starting resource location or an ending resource location.

Alternatively, the control channel configuration information may include one or more of: synchronization channel configuration information, broadcast channel configuration information, access parameter configuration information, resource allocation channel configuration information or feedback channel configuration information.

On the basis of the fourth aspect or any one of the first to third possible implementation modes of the fourth aspect, in a fourth possible implementation mode, the control channel description list may further include type information of M types of terminal devices, where M is a positive integer and a correspondence between the M types of terminal devices and the description information of the N control channels may be that each type of terminal device corresponds to description information of one or more of the control channels.

Alternatively, frequency domain resources scheduled by any two of the control channels in the description information of the N control channels may be completely different or partially overlapping.

On the basis of the fourth aspect or any one of the first to third possible implementation modes of the fourth aspect, in a fifth possible implementation mode, the receiving module may be further configured to receive control channel type instruction information sent by the first communication node before the processing module processes at least one of the control channel or the data channel according to the control channel description list received by the receiving module.

The processing module may be configured to process at least one of the control channel or the data channel according to the control channel description list received by the receiving module by: using description information of n specified control channels in the description information of the N control channels to process at least one of the control channel or the data channel, where n is a positive integer less than or equal to N.

On the basis of the fourth aspect or any one of the first to third possible implementation modes of the fourth aspect, in a sixth possible implementation mode, the information transmission apparatus may further include: a sending module, which is connected to the receiving module and configured to send a random access signal to the first communication node or send a request message for the control channel description list to the first communication node before the receiving module receives the control channel description list sent by the first communication node.

Alternatively, the information transmission apparatus may further include: an obtaining module, which is connected to the receiving module and configured to obtain a system operating bandwidth before the receiving module receives the control channel description list sent by the first communication node.

On the basis of the fourth aspect or any one of the first to third possible implementation modes of the fourth aspect, in a seventh possible implementation mode, the receiving module may be further configured to receive a first notification message send by the first communication node with a signaling before the receiving module receives the control channel description list sent by the first communication node, where the first notification message instructs the first communication node to determine to send the control channel description list.

Alternatively, the receiving module may be further configured to receive a second notification message sent by the first communication node with a signaling after the receiving module receives the control channel description list sent by the first communication node, where the second notification message instructs whether the control channel description list is updated.

Alternatively, the receiving module may be further configured to receive a synchronization channel sent by the first communication node, where resources used for sending the control channel description list are the same as resources used for sending the synchronization channel.

On the basis of the fourth aspect or any one of the first to third possible implementation modes of the fourth aspect, in an eighth possible implementation mode, the second communication node in which the receiving module is disposed belongs to a set of second communication nodes of a preset type. The set of second communication nodes of the preset type is a set of second communication nodes supporting machine-type communication, or a set of second communication nodes supporting low-delay high-reliability machine-type communication, or a set of second communication nodes supporting low-rate machine-type communication, or a set of second communication nodes supporting mobile broadband.

In a fifth aspect, an embodiment of the present disclosure provides an information transmission system, including a first communication node and a second communication node connected to the first communication node.

The first communication node is provided with the information transmission apparatus according to any one of the third aspect and the second communication node is provided with the information transmission apparatus according to any one of the fourth aspect.

An embodiment of the present disclosure further provides a computer-readable storage medium configured to store computer-executable instructions for executing the information transmission method according to any one of the first aspect or the second aspect when executed by a processor.

In the information transmission method, apparatus and system provided by the present application, the first communication node obtains the control channel description list and sends the control channel description list to the second communication node which communicates with the first communication node, so that the second communication node processes at least one of the control channel and the data channel according to the control channel description list. The control channel description list includes the description information of the N control channels. In the embodiments of the present disclosure, the control channel description list may be configured according to service requirements and meet the requirement of flexibly designing control channel configuration content, and a standard scheme of control channels in the 5G system is rationally designed.

Other aspects can be understood after the accompanying drawings and detailed description are read and understood.

DETAILED DESCRIPTION

Figure 1:
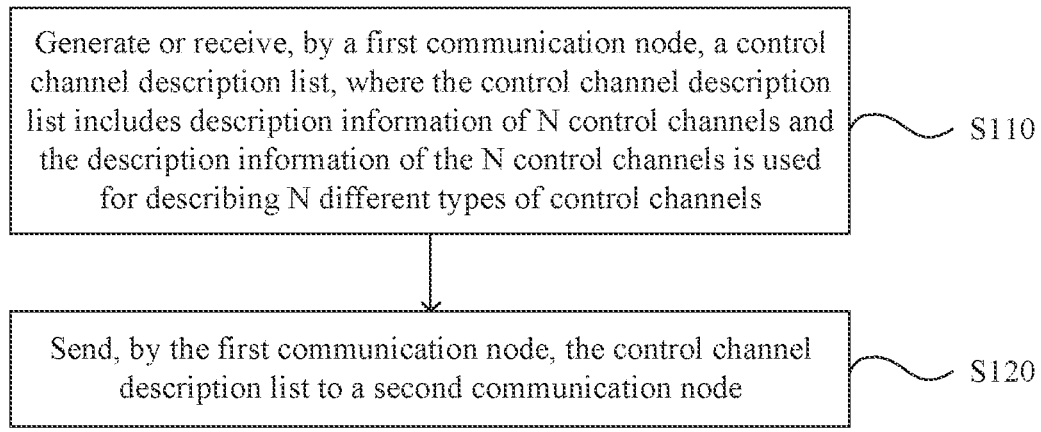
FIG. 1 is a flowchart of an information transmission method according to an embodiment of the present disclosure.

Embodiments of the present application will be described below in detail with reference to the accompanying drawings. If not in collision, the embodiments described herein and the features thereof may be combined with each other.

The steps illustrated in the flowcharts of the accompanying drawings may be executed by, for example, a set of computer-executable instructions in a computer system. Although the flowcharts illustrate a logical order of execution, the steps illustrated or described may, in some cases, be executed in an order different from that herein.

A design scheme of control channels in an LTE/LTE-A system is briefly introduced. A physical downlink control channel (PDCCH) and an enhanced physical downlink control channel (EPDCCH) are defined. Information carried in a physical control format indicator channel (PCFICH) is used for instructing the number of orthogonal frequency division multiplexing (OFDM) symbols for transmitting the PDCCH in one sub-frame. A physical hybrid automatic repeat-reQuest (ARQ) indicator channel (PHICH) is used for carrying feedback information for an acknowledgement/a negative acknowledgement (ACK/NACK) of uplink transmission data. The downlink control channel employs blind detection, that is, a terminal device attempts to demodulate the downlink control channel with different aggregation levels and candidate sets in a certain search space. The search space of an existing user equipment (UE) is illustrated in Table 1 and Table 2. The search space includes candidate sets corresponding to different aggregation levels. When a UE demodulates the control channel, the UE needs to trying demodulating each candidate set until a candidate set is demodulated correctly; otherwise the UE considers that the UE has not received its own control channel.

TABLE 1

PDCCH search space

Search Space $S_k^{(L)}$

| Type | Aggregation Level: L | Size (in CCEs) | Number of PDCCH Candidates: $M^{(L)}$ |
|---|---|---|---|
| UE-specific | 1 | 6 | 6 |
| | 2 | 12 | 6 |
| | 4 | 18 | 2 |
| | 8 | 16 | 2 |

TABLE 2

EPDCCH search space

Number of EPDCCH Candidates: $M_p^{(L)}$ for Case 3

| $N_{RB}^{Xp}$ | L = 1 | L = 2 | L = 4 | L = 8 | L = 16 |
|---|---|---|---|---|---|
| 2 | 8 | 4 | 2 | 1 | 0 |
| 4 | 4 | 5 | 4 | 2 | 1 |
| 8 | 4 | 4 | 4 | 2 | 2 |

Table 2 shows a case 3 where physical resource blocks (PRBs) of a distributed EPDCCH are centralized. In Tables 1 and 2, the PDCCH/EPDCCH is used for carrying downlink control information (DCI). The DCI includes: uplink and downlink scheduling information and uplink power control information.

A downlink grant (DL grant) and an uplink grant (UL grant) are respectively used in the existing LTE system for scheduling downlink data transmission and uplink data transmission of a terminal device. The DL grant and the UL grant are collectively referred to as the DCI and carried in the PDCCH or the EPDCCH. Downlink data is carried in a physical downlink shared channel (PDSCH), and uplink data is carried in a physical uplink shared channel (PUSCH). In the existing LTE system, the PDCCH uses resources in the first to fourth orthogonal frequency division multiplexing (OFDM) symbols in a system bandwidth and uses a control channel element (CCE) as a basic aggregation resource granularity and uses transmit diversity as a transmission mode. The EPDCCH uses resources in some PRBs in the system bandwidth and uses an enhanced control channel element (ECCE) as the basic aggregate resource granularity and uses a centralized or distributed transmission mode. It can be seen that the design of LTE standard control channels is single and of poor flexibility. When services to be supported have greatly different requirements on delay, reliability and the like, the system efficiency is significantly reduced.

In this background, it has been stated that an explosive growth occurs in wireless network traffic. It is predicted by market institutes that in the next 10 years, wireless data services will increase 500-1000 times and increase 1.6-2 times annually on average, which puts higher requirements on network capacity of a wireless communication system. For wireless network applications in 2020 and further, the mobile Internet and the Internet of Things will become a main driving force for mobile communication development. The 5G technology will meet requirements for diversified services in residential, work, leisure and transportation areas. Even in scenarios such as dense residential areas, offices, stadiums, open-air gatherings, subways, expressways, high-speed rails and wide-area coverage which are characterized by ultra-high traffic density, ultra-high connection density and ultra-high mobility, the 5G technology may also provide users with extremely good service experience such as ultra-high definition videos, virtual reality, augmented reality, cloud desktops and online games. Meanwhile, the 5G technology will penetrate into the Internet of Things and various industries and deeply integrate with industrial facilities, medical instruments and vehicles to effectively meet requirements for diversified services in vertical industries such as industry, medical treatment and transportation and achieve the "Internet of everything". From perspectives of service requirements and challenges in main application scenarios of the mobile Internet and the Internet of Things, four main 5G technical scenarios may be summarized as: a continuous wide-area coverage scenario, a high-capacity hot-spot scenario, a low-power-consumption high-connection-density scenario and a low-delay high-reliability scenario.

If the design scheme of control channels in the existing LTE technology is applied to the 5G system, a requirement of the 5G system on design flexibility cannot be met, and the poor scalability and adaptability of control channels in the related art cannot satisfy a design concept of "forward compatibility". For example, when different types of control channels are used for different services, the design scheme of control channels in the existing LTE technology allocates resources with poor flexibility and adaptability, which will seriously decrease system spectrum efficiency and increase system maintenance costs. In addition, the terminal device which can support multiple services cannot obtain type information of control channels supported by the system and can only determine the support situation of the current system for different services through blind detection, which greatly affects system performance, increases power consumption and control overhead of the terminal device, and the system has poor "forward compatibility".

A communication node in each embodiment of the present application described below may be, for example, a based service (BS) in a wireless communication system or an evolved Node B (eNB) in an LTE system. In the 5G system, the first communication node may also be a terminal device. A second communication node may be, for example, a terminal device. The specific embodiments provided by the present application may be combined with each other, and identical or similar concepts or processes may not be repeated in some embodiments.

FIG. 1 is a flowchart of an information transmission method according to an embodiment of the present disclosure. The information transmission method of this embodiment is suitable for controlling channels in a 5G system, and may be executed by an information transmission apparatus. The information transmission apparatus is implemented using a combination of hardware and software and the apparatus may be integrated onto a processor of a first communication node for the processor's use. As illustrated in FIG. 1, the information transmission method in this embodiment may include the steps described below.

In S110, a first communication node generates or receives a control channel description list. The control channel description list includes description information of N control channels and the description information of the N control channels is used for describing N different types of control channels.

The description information of each of the control channels may include one or more of: control channel configuration information, reference signal configuration information, link resource configuration information, operating bandwidth configuration information, puncturing configuration information, frequency hopping configuration formation, transmission time interval length configuration information, power control configuration information or beam configuration information.

Figure 2:
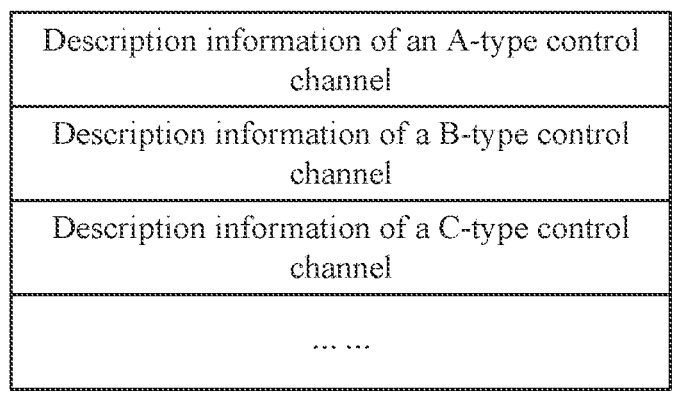
FIG. 2 is a schematic diagram of a control channel description list in the information transmission method according to the embodiment illustrated in FIG. 1.

The information transmission method provided by the present disclosure designs configuration content of control channels in the 5G system. The configuration content of the control channels in this embodiment may be described by the control channel description list. The first communication node generates or receives the control channel description list. The control channel description list includes the description information of the N control channels which describes the N control channels and N is a positive integer in this embodiment. In the embodiments of the present application, the description information of each of the control channels may include one or more of: control channel configuration information, reference signal configuration information, link resource configuration information, operating bandwidth configuration information, puncturing configuration information, frequency hopping configuration formation, transmission time interval length configuration information, power control configuration information or beam configuration information. Moreover, frequency domain resources schedulable by any two control channels in the description information of the N control channels may be completely different, partially overlapping or completely overlapping. Completely different frequency domain resources indicate that the frequency domain resources schedulable by any two control channels may be continuous or discrete. FIG. 2 is a schematic diagram of the control channel description list in the information transmission method illustrated in FIG. 1. The control channel description list illustrated in FIG. 2 includes description information of an A-type control channel, description information of a B-type control channel and description information of a C-type control channel and may further include description information of a control channel of another type.

It is to be noted that in this embodiment, S110 may be that the first communication node generates the control channel description list or that the first communication node receives the control channel description list sent by another communication node. That is to say, the control channel description list may be generated by the first communication node or another communication node in the 5G system. The another communication node is generally an upper network device with respect to the first communication node, for example, a device similar to a radio resource control (RRC) device in the LTE system. In a specific implementation, the first communication node or another communication node may generate the control channel description list according to service types to be currently supported by a network or a load situation of the network.

In S120, the first communication node sends the control channel description list to a second communication node.

In this embodiment, after the first communication node generates or receives the control channel description list, the first communication node may send the control channel description list to the second communication node in the network which communicates with the first communication node. The description information of the N control channels in the control channel description list is used for describing the control of channels between the first communication node and the second communication node and resources used for transmitting uplink and downlink data. That is, the second communication node may process at least one of a control channel or a data channel according to the received control channel description list. For example, after the second communication node learns which control channels are included in the description information of the N control channels, the second communication node may process a corresponding control channel and data channel according to the description information of each of the control channels.

Compared with the single design of control channels in the existing LTE technology, the control channel description list in this embodiment integrates configuration content of multiple control channels, and the integrated content may be selectively integrated into the configuration content according to practical applications. For example, according to different application scenarios, different service types or QoS requirements of different service types, corresponding content is selected to be configured in the control channel description list so that the currently configured control channel description list may satisfy requirements of the communication nodes for the current service.

For example, when the network needs to support three services including super mobile broadband, low-delay high-reliability machine-type communication and massive machine-type communication, it is necessary to generate a control channel description list including description information of three control channels for describing transmission periods and resources of the control channels.

In the embodiments of the present disclosure, the control channels may be flexibly configured according to service requirements, and the second communication node obtains a configuration situation of the control channels from the control channel description list and performs subsequent processing operations such as control channel demodulation and data demodulation.

In the information transmission method in this embodiment, the first communication node generates or receives the control channel description list, and then sends the control channel description list to the second communication node which communicates with the first communication node, so that the second communication node processes at least one of the control channel and the data channel according to the control channel description list. The control channel description list includes the description information of the N control channels. In this embodiment, the control channel description list may be configured according to service requirements and meet a requirement of flexibly designing control channel configuration content, and a standard scheme of control channels in the 5G system is rationally designed.

In an exemplary embodiment, on the basis of the embodiments of the present disclosure, the control channel description list in this embodiment may further include type information of M types of terminal devices, where M is a positive integer. In a specific implementation, a correspondence between the M types of terminal devices and the description information of the N control channels is that each type of terminal device corresponds to description information of one or more of the control channels. In addition, the description information of each of the N control channels may correspond to one or more types of terminal devices. In this embodiment, the type of the terminal device may be distinguished based on services, computing power or supported standard versions.

Figure 3:
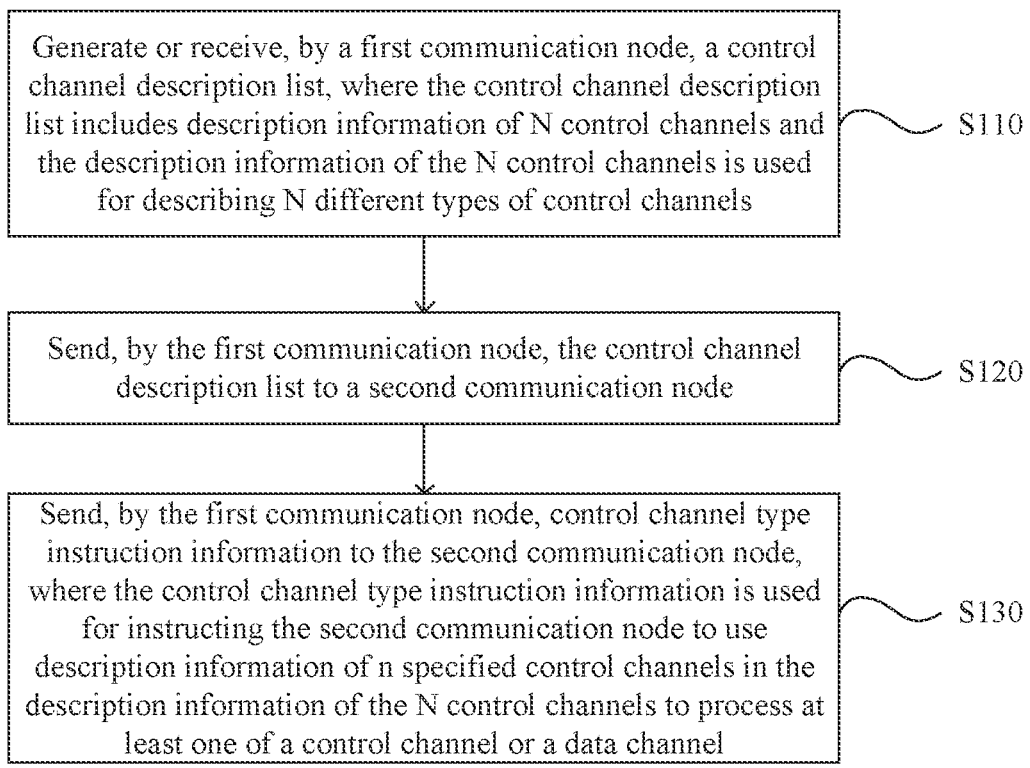
FIG. 3 is a flowchart of another information transmission method according to an embodiment of the present disclosure.

FIG. 3 is a flowchart of another information transmission method according to an embodiment of the present disclosure. On the basis of the embodiment illustrated in FIG. 1, the information transmission method in this embodiment further includes the step described below.

In S130, the first communication node sends control channel type instruction information to the second communication node, where the control channel type instruction information is used for instructing the second communication node to use description information of n specified control channels in the description information of the N control channels to process at least one of a control channel or a data channel.

In this embodiment, the first communication node may not only send the control channel description list to the second communication node but also send the control channel type instruction information to the second communication node, to notify the second communication node of control channels of which the description information is used, which means that n is a positive integer less than or equal to N. In an exemplary embodiment, a length of the control channel type instruction information in this embodiment is determined by the variable N, that is, the first communication node generates a signaling to notify the second communication node according to N. For example, the first communication node sends a description list of 3 control channels denoted as list 1 to list 3 and notifies the second communication node to use a description list of a first control channel. In this case, the first communication node notifies the second communication node of the above information with a signaling of 2 bits. In the 2 bits, "00" represents description information of the first control channel, "01" represents description information of a second control channel, "10" represents description information of a third control channel, and "11" represents that no description information is used.

It is to be noted that the present embodiment does not limit the sequence in which the first communication node sends the control channel description list and the control channel type instruction information, that is, the present embodiment does not limit the execution order of S130 and S120. The embodiment illustrated in FIG. 3 is shown using an example in which S130 is executed after S120.

Figure 4:
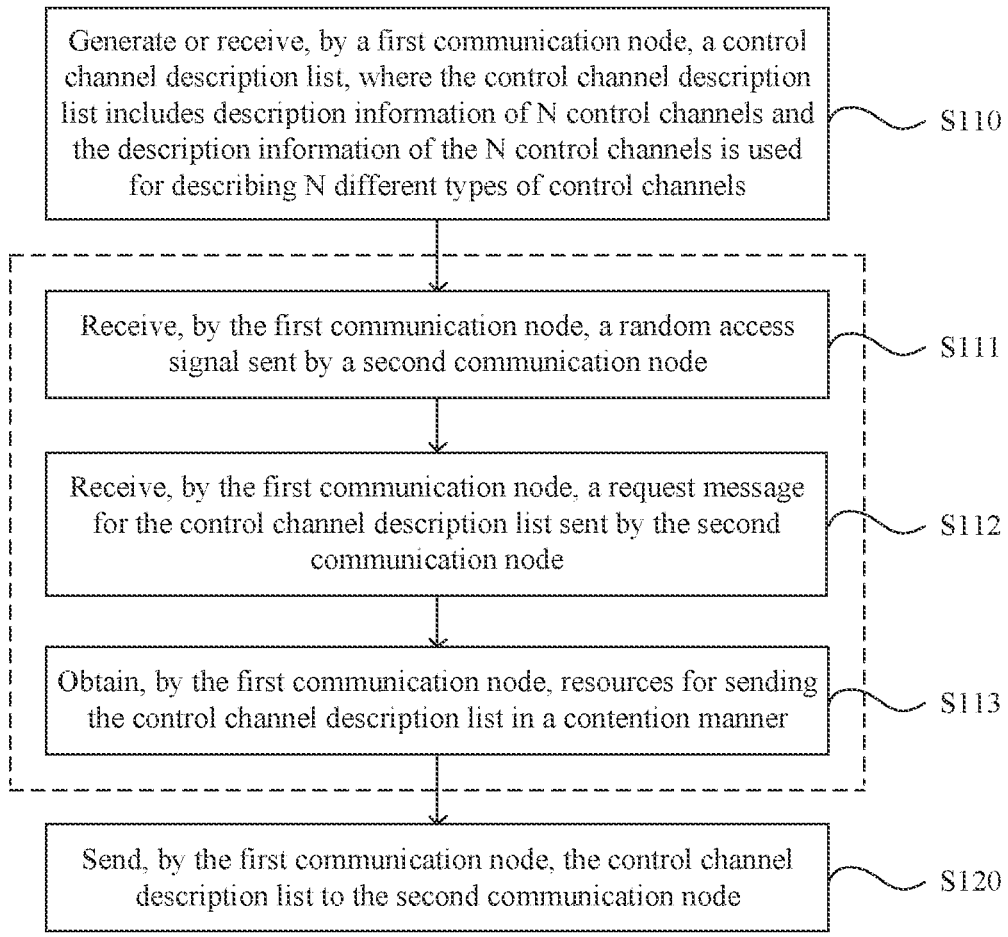
FIG. 4 is a flowchart of another information transmission method according to an embodiment of the present disclosure.

FIG. 4 is a flowchart of another information transmission method according to an embodiment of the present disclosure. On the basis of the embodiment illustrated in FIG. 1, the information transmission method in this embodiment further may include S111 before S120. In S111, the first communication node receives a random access signal sent by the second communication node.

In an exemplary embodiment, the information transmission method in this embodiment may further include S112 before S120. In S112, the first communication node receives a request message for the control channel description list sent by the second communication node.

In this embodiment, the first communication node may learn that the second communication node needs to establish a connection and communication with the first communication node when the second communication node has sent the random access signal. That is, the first communication node may send the obtained control channel description list after receiving the random access signal. In an exemplary embodiment, the first communication node in this embodiment may further learn a requirement of the second communication node, and then send the description information of the corresponding number of control channels when the second communication node has sent the request message for the control channel description list.

In an exemplary embodiment, before the first communication node sends the control channel description list, that is, before S120 is executed, S113 may further be executed. In S113, the first communication node obtains resources for sending the control channel description list in a contention manner. That is, the first communication node in this embodiment may obtain sending resources in the contention manner and then perform the sending operation after the first communication node determines that the control channel description list needs to be sent.

It is to be noted that in this embodiment, S111, S112 and S113 may be selectively executed or wholly executed. The embodiment illustrated in FIG. 4 is shown using an example in which S111, A112 and S113 are sequentially executed.

Figure 5:
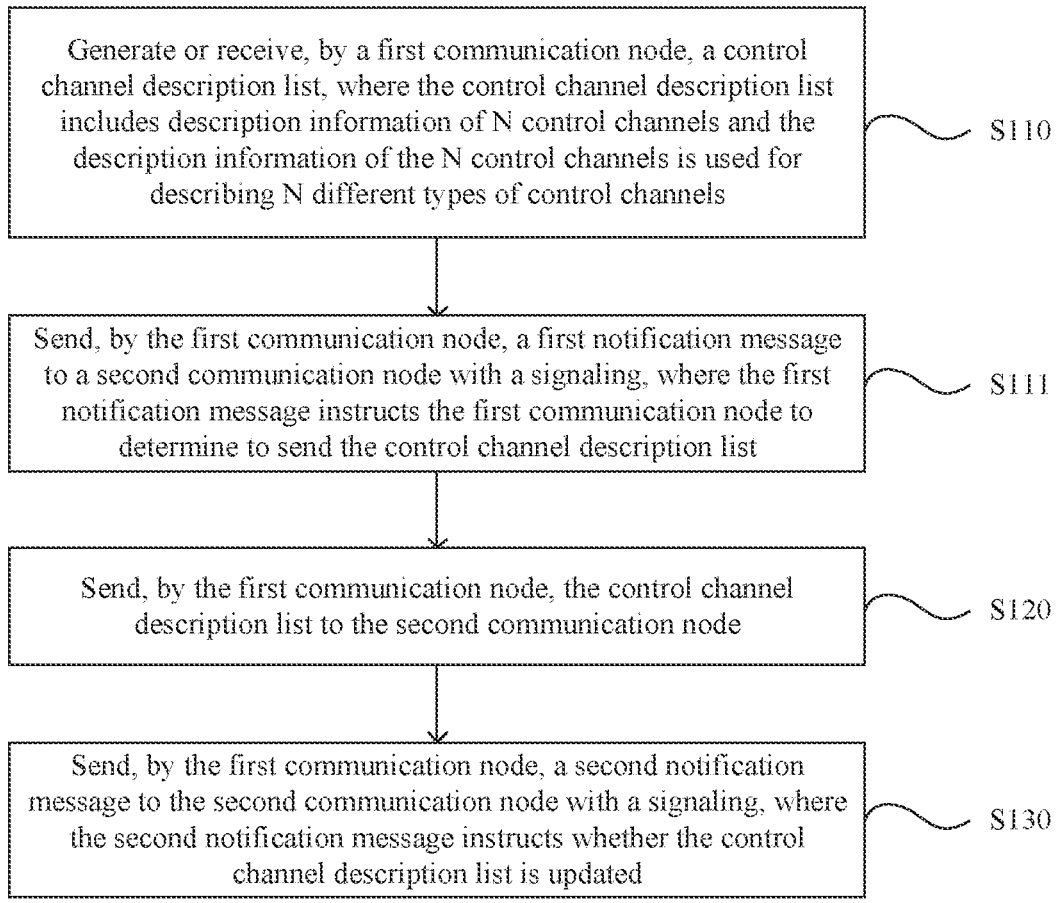
FIG. 5 is a flowchart of another information transmission method according to an embodiment of the present disclosure.

In an exemplary embodiment, on the basis of each of the above embodiments, FIG. 5 shows a flowchart of another information transmission method according to an embodiment of the present disclosure. The information transmission method in this embodiment is shown on the basis of the embodiment illustrated in FIG. 1 and further includes S111 before S120.

In S111, the first communication node sends a first notification message to the second communication node with a signaling, where the first notification message instructs the first communication node to determine to send the control channel description list.

In an exemplary embodiment, the information transmission method in this embodiment may further include S130 after S120.

In S130, the first communication node sends a second notification message to the second communication node with a signaling, where the second notification message instructs whether the control channel description list is updated.

The first communication node in this embodiment may send the first notification message and the second notification message in a unicast or broadcast manner, and the signaling in this embodiment may be carried in a physical broadcasting control channel, for example. Similarly, the first communication node in this embodiment may further notify the second communication node of the resources used for sending the control channel description list and a transmission period of the control channel description list with the signaling. The control channel description list in this embodiment may further include transmission period information of the control channel description list, that is, the control channel description list in this embodiment may be periodically sent by the first communication node.

In an exemplary embodiment, the information transmission method in this embodiment may further include that the first communication node sends a synchronization channel to the second communication node. Resources used by the first communication node for sending the control channel description list are the same as resources used by the first communication node for sending the synchronization channel.

It is to be noted that each of the control channels in each embodiment of the present application may be sent by the first communication node or another communication node and the first communication node sends the control channel description list at a carrier frequency different from a carrier frequency for sending the N control channels. In addition, in each embodiment of the present application, the second communication node receiving the control channel description list may belong to a set of second communication nodes of a preset type. The set of second communication nodes of the preset type may be a set of second communication nodes supporting machine-type communication, or a set of second communication nodes supporting low-delay high-reliability machine-type communication, or a set of second communication nodes supporting low-rate machine-type communication, or a set of second communication nodes supporting mobile broadband.

Some possible implementation modes of the embodiments of the present disclosure are described below through some applications of the configuration content in the control channel description list designed by the embodiments of the present disclosure.

In an exemplary embodiment, on the basis of each of the above embodiments, the description information of each of the control channels in this embodiment includes, for example, the control channel configuration information. The control channel configuration information may include one or more of: a resource location, a subcarrier spacing, a waveform, a transmission period, a valid time length, a resource mapping manner, a spreading code word, a number of information bits, a modulation and coding mode, a code rate, a multi-antenna transmission mode, a number of repetitions or a repetition period.

Figure 6:
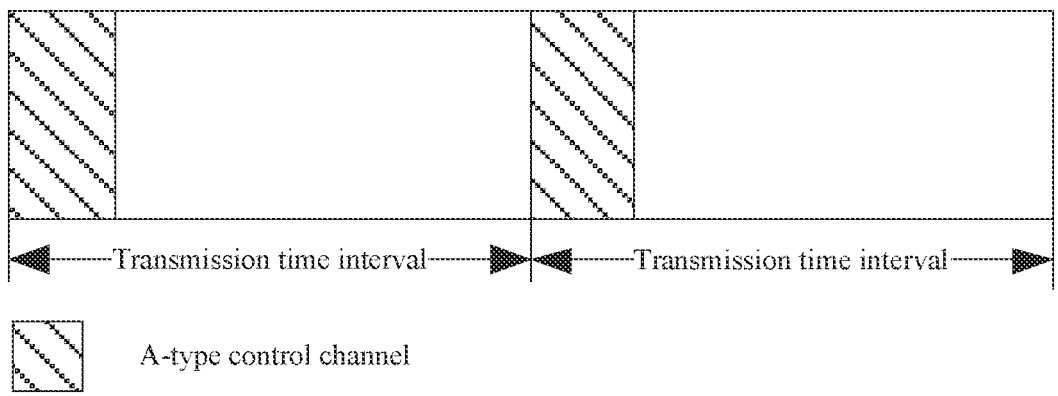
FIG. 6 is a schematic diagram of a resource location in an information transmission method according to an embodiment of the present disclosure.

In an application scenario of this embodiment, the control channel configuration information may include the resource location. The resource location may include at least one of: a starting resource location or an ending resource location. For example, if a resource length and the starting resource location are known, the ending resource location may be calculated. For another example, if the starting resource location and the ending resource location are known, the resource length may be calculated. In a specific implementation of this embodiment, the second communication node obtains the starting resource location of a control channel related to the second communication node according to the control channel configuration information. FIG. 6 is a schematic diagram of a resource location in an information transmission method according to an embodiment of the present disclosure. The resource location refers to a relative position of each of the control channels in a transmission time interval corresponding to each of the control channels. For example, a control channel described by the resource location in FIG. 6 is an A-type control channel. The A-type control channel corresponds to a transmission time interval of 1 ms or 0.5 ms.

In another application scenario of this embodiment, the control channel configuration information may include at least one of: the subcarrier spacing or the waveform. Accordingly, after receiving the control channel description list, the second communication node may obtain information of a control channel related to the second communication node according to the control channel configuration information. For example, different control channels have different subcarrier spacings. The control channel of the massive machine-type communication has a subcarrier spacing of 3.75 KHz, the control channel of the mobile broadband has a subcarrier spacing of 15 kHz, and the control channel of the high-frequency communication has a subcarrier spacing of 480 kHz. For another example, different control channels have different waveforms. The waveform of the massive machine-type communication is frequency division multiplexing (FDM), and the waveforms of the mobile broadband and the high-frequency communication are OFDM.

Figure 7:
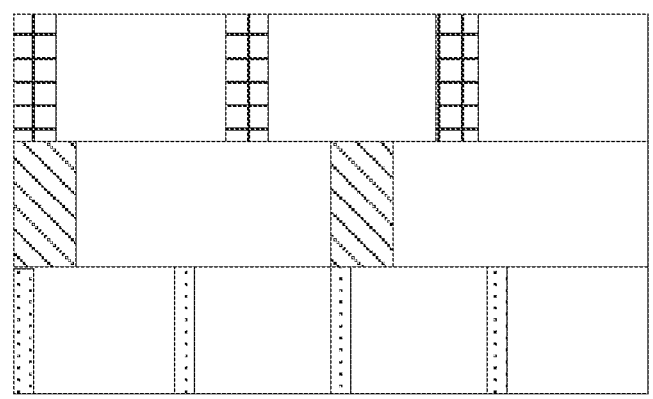
FIG. 7 is a schematic diagram of a distribution of control channels in an information transmission method according to an embodiment of the present disclosure.
Figure 7:
Figure 7:
Figure 7:
Figure 8:
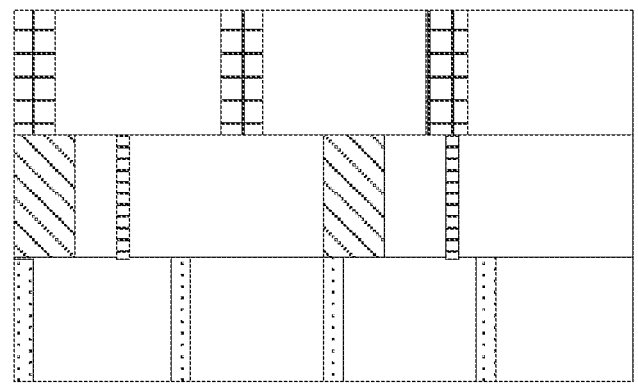
FIG. 8 is a schematic diagram of another distribution of control channels in an information transmission method according to an embodiment of the present disclosure.
Figure 9:
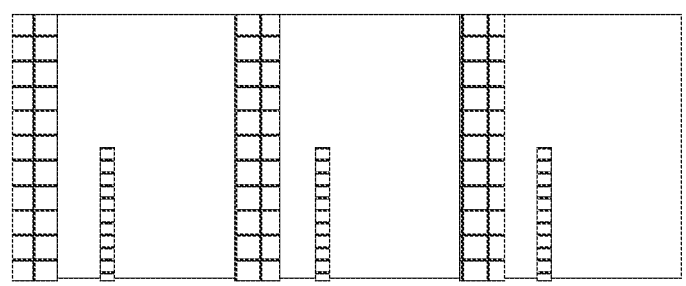
FIG. 9 is a schematic diagram of another distribution of control channels in an information transmission method according to an embodiment of the present disclosure.
Figure 10:
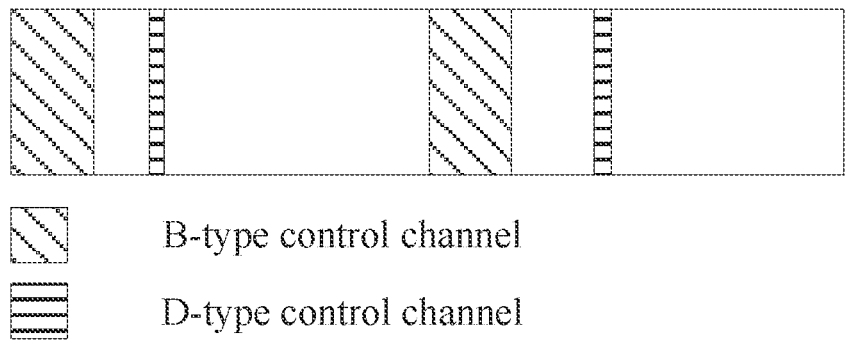
FIG. 10 is a schematic diagram of another distribution of control channels in an information transmission method according to an embodiment of the present disclosure.

In another application scenario of this embodiment, the control channel configuration information may include the transmission period. Accordingly, after receiving the control channel description list, the second communication node may obtain information of a control channel related to the second communication node according to the control channel configuration information. FIG. 7 is a schematic diagram of a distribution of control channels in an information transmission method according to an embodiment of the present disclosure. FIG. 8 is a schematic diagram of another distribution of control channels in an information transmission method according to an embodiment of the present disclosure. FIG. 9 is a schematic diagram of another distribution of control channels in an information transmission method according to an embodiment of the present disclosure. FIG. 10 is a schematic diagram of another distribution of control channels in an information transmission method according to an embodiment of the present disclosure. FIGS. 7 to 10 are schematic diagrams illustrating the distribution of multiple types of control channels. Resources used by different types of control channels in FIG. 7 are frequency-divided. Resources used by different types of control channels in FIG. 8 are frequency-divided. The different types of control channels in FIGS. 7 and 8 do not overlap in frequency domain. Resources used by the B-type control channel and the D-type control channel in FIG. 8 are time-divided. Different types of control channels in FIG. 9 use partially overlapping frequency domain resources and different time domain resources. Different types of control channels in FIG. 10 use the same frequency domain resources and different time domain resources. For example, the transmission period of a machine-type communication terminal insensitive to time may be set to be greater than the transmission period of the low-delay high-reliability machine-type communication terminal. The B-type control channel in FIG. 7 is the transmission period of the machine-type communication terminal insensitive to time. The transmission period of the B-type control channel may be set to the transmission period of the C-type control channel in FIG. 7, and the transmission period may be configured in specific time-domain units. For example, if each basic transmission unit has a time-domain length of 0.1 ms and the transmission period has 10 basic transmission units, the transmission period of the control channel is 1 ms.

Figure 11:
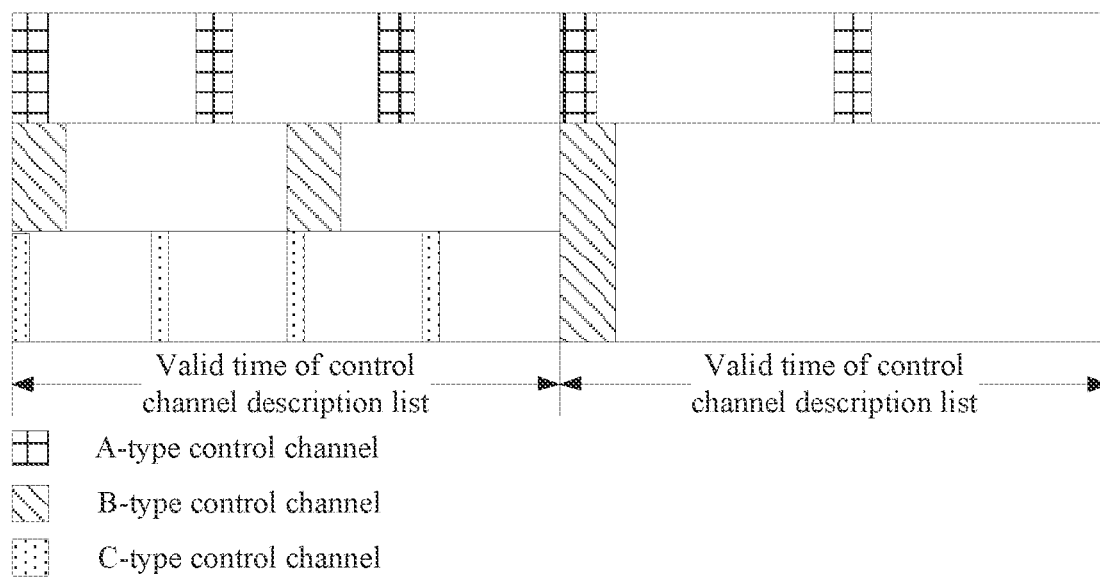
FIG. 11 is a schematic diagram of a valid time length of a control channel description list in an information transmission method according to an embodiment of the present disclosure.

In another application scenario of this embodiment, the control channel configuration information may include the effective time length. Accordingly, after receiving the control channel description list, the second communication node may obtain information of a control channel related to the second communication node according to the control channel configuration information. FIG. 11 is a schematic diagram of a valid time length of a control channel description list in an information transmission method according to an embodiment of the present disclosure. For example, if the effective time length of the control channel configuration information obtained by the second communication node according to the configuration information is 10 ms, the second communication node may obtain the control channel according to configuration parameters given by the control channel configuration information within the effective time length, and the subsequent effective time of the control channel configuration information is given by a new control channel description list.

In another application scenario of this embodiment, the control channel configuration information may include the number of repetitions. Accordingly, after receiving the control channel description list, the second communication node may obtain information of a control channel related to the second communication node according to the control channel configuration information. For example, for machine-type communication services with different coverage levels, different wireless transmission environments have different numbers of repetitions of the control channel. Generally, a worse channel environment requires more repetitions of the control channel.

In addition, in other application scenarios of this embodiment, the control channel configuration information may further include one or more of: the resource mapping manner, the spreading code word, the number of information bits, the modulation and coding mode, the code rate, the multi-antenna transmission mode, or a repetition period. Accordingly, after receiving the control channel description list, the second communication node may also obtain information of a control channel related to the second communication node according to the control channel configuration information. For example, the resource mapping manner may be physically continuous or discrete. Different types of control channels use different sets of spreading code words or different generation types of spreading code words. Different types of control channels transmit different numbers of information bits and different service channels have different modulation and coding modes and code rates. Generally, in a poor channel environment, the modulation and coding mode and spectrum efficiency of the control channel of the service may be lower. Different types of control channels use different multi-antenna transmission modes. For example, when the terminal has a relatively strong capability, a more complex multi-antenna transmission mode may be used.

In another possible implementation mode of this embodiment, the control channel configuration information in the description information of each of the control channels may include one or more of: synchronization channel configuration information, broadcast channel configuration information, access parameter configuration information, resource allocation channel configuration information or feedback channel configuration information. In a specific implementation, the synchronization channel configuration information may include one or more of: a resource location, a transmission period, a resource mapping manner or a synchronization sequence; or the broadcast channel configuration information may include one or more of: the resource location, the transmission period, the resource mapping manner, a valid information length or an information type; or the access parameter configuration information may include one or more of: the resource location, the transmission period, the resource mapping manner or an access sequence set; or the resource allocation channel configuration information is used for instructing a frequency domain range of schedulable data resources by each of the control channels; or the feedback channel configuration information may include one or more of: a feedback interval for an acknowledgement or a negative acknowledgement (ACK/NACK), or a channel state information feedback mode. The ACK/NACK feedback interval may be configured, for example, to complete the feedback within one transmission time interval, or complete the feedback within P transmission time intervals. Each transmission time interval may include one downlink control channel and one uplink control channel, where P is a positive integer. The channel state information feedback mode may be, for example, a hybrid automatic repeat reQuest (HARQ) or an asynchronous HARQ.

In an exemplary embodiment, on the basis of each of the above embodiments, the description information of each of the control channel includes, for example, the reference signal configuration information. In an application scenario of this embodiment, a reference signal configured with the reference signal configuration information may be used for demodulating a reference signal used by each of the control channels and may be further used for measuring channel state information. In another application scenario of this embodiment, the reference signal configured with the reference signal configuration information may be used for beam direction training. For example, a communication node operating at a high frequency band which is greater than 6 GHz, may use the reference signal for training, tracking and optimizing at least one of a transmitting beams and receiving beams. The reference signal configuration information in this embodiment may include one or more of: a resource location, a sequence set or a measurement window. The resource location is, for example, a location in time domain or frequency domain, and may also be referred to as a pilot pattern. The sequence set is, for example, a sequence generation manner, a number of available sequences and the like. The measurement window is, for example, at least one of a transmission period or a duration of the reference signal.

Figure 12:
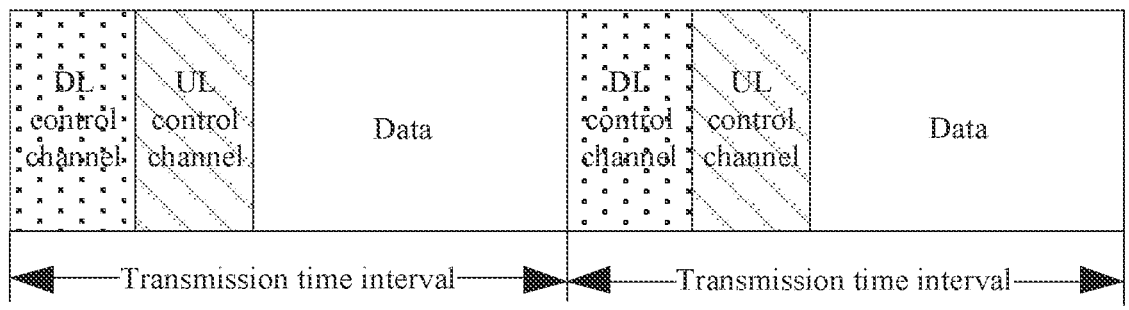
FIG. 12 is a schematic diagram of a transmission time interval in an information transmission method according to an embodiment of the present disclosure.
Figure 13:
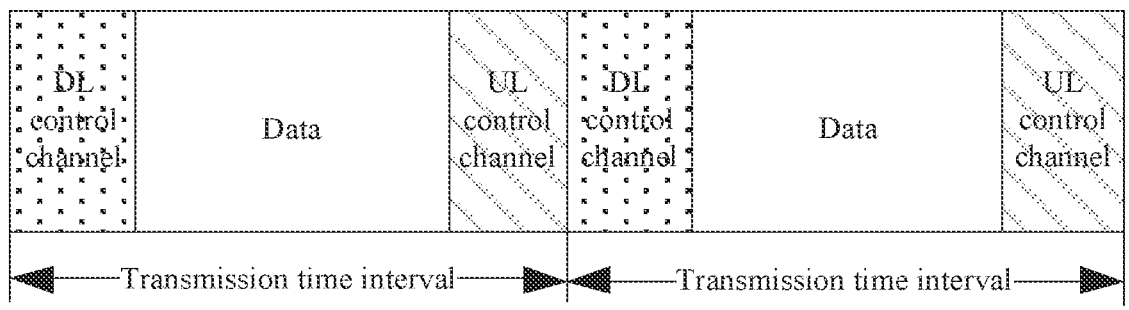
FIG. 13 is a schematic diagram of another transmission time interval in an information transmission method according to an embodiment of the present disclosure.

In an exemplary embodiment, on the basis of each of the above embodiments, the description information of each of the control channel includes, for example, the link resource configuration information. The link resource configuration information may include one or more of: a number of each of the control channels in a transmission time interval corresponding to the each of the control channels, or a transmission direction of each of the control channels. Each of the control channels in the transmission time interval may include at least one of: a downlink control channel or an uplink control channel. FIG. 12 is a schematic diagram of a transmission time interval in an information transmission method according to an embodiment of the present disclosure. FIG. 13 is a schematic diagram of another transmission time interval in an information transmission method according to an embodiment of the present disclosure. Referring to FIGS. 12 and 13, one transmission time interval may include one downlink control channel and one uplink control channel. In FIG. 13, the downlink control channel is located at the beginning of the transmission time interval and the uplink control channel is located at the end of the transmission time interval. A middle portion of the transmission time interval may be used for transmitting at least one of uplink data or downlink data. In addition, the uplink control channel or the downlink control channel may also include the reference signal for measuring the channel state information.

In an exemplary embodiment, on the basis of each of the above embodiments, the description information of each of the control channel includes, for example, the operating bandwidth configuration information. The operating bandwidth configuration information is used for instructing a frequency domain resource range schedulable by each of the control channels or an operating frequency band of each of the control channels. In a specific implementation, the frequency domain resource range schedulable by each of the control channels is generally greater than or equal to a frequency domain resource range used for transmitting each of the control channels. For example, the frequency domain resource range of a certain control channel is 180 kHz. When this control channel is used for scheduling resources for the second communication node, the schedulable frequency domain resource range may be 20 MHz and the advantage is that the wireless communication system may maximizes the use of valuable wireless resources according to a practical load situation. Furthermore, the operating frequency band of each of the control channels may be different from a frequency band used for sending the description list of the each of the control channels. Generally speaking, the description list of each of the control channels is sent in a relatively low frequency band which is usually lower than 3 GHz to ensure sufficient system coverage and help reduce network maintenance costs.

In an exemplary embodiment, on the basis of each of the above embodiments, the description information of each of the control channel includes, for example, the transmission time interval length configuration information. The transmission time interval length configuration information may include a time length corresponding to each of the control channels, that is, in the time length, the second communication node may operate according to related configuration in the description information of the control channels. A transmission time interval length is configured in standard basic resource units according to the transmission time interval length configuration information. The basic resource unit has a length of 0.1 ms or 0.5 ms in time domain.

Figure 14:
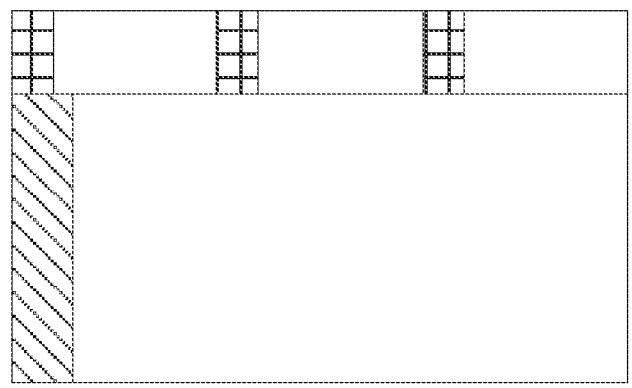
FIG. 14 is a schematic diagram of demodulated control channels in an information transmission method according to an embodiment of the present disclosure.

In an exemplary embodiment, on the basis of each of the above embodiments, the description information of each of the control channel includes, for example, the puncturing configuration information. The puncturing configuration information is used for instructing the second communication node whether to decode with information on resources used for transmitting X control channels when data transmission resources used by the second communication node include resources for transmitting Y control channels. The X control channels belong to the Y control channels, X is a positive integer less than or equal to N, and Y is a positive integer greater than or equal to X and less than or equal to N. FIG. 14 is a schematic diagram of demodulated control channels in an information transmission method according to an embodiment of the present disclosure. The control channel description list in FIG. 14 includes description information of two control channels, which are respectively referred to as an A-type control channel and a B-type control channel. The control channel transmission resources used by the A-type control channel and the B-type control channel are frequency-divided. For example, total system bandwidth resources are 20 MHz, the A-type control channel occupies 15 MHz, the B-type control channel occupies 5 MHz, and the B-type control channel has a shorter transmission period than the A-type control channel; if data transmission resource allocated to the second communication node are 20 MHz in description information of the A-type control channel and two B-type control channels are included in time domain, the second communication node needs to determine whether to decode with data on resources corresponding to the two B-type control channels (puncturing data) according to the puncturing configuration information when the second communication node receives data on corresponding resources. If the puncturing configuration information instructs that puncturing is needed, the second communication node does not decode with the punctured data, and otherwise the second communication node decodes with the puncturing data.

In an exemplary embodiment, on the basis of each of the above embodiments, the description information of each of the control channel includes, for example, the frequency hopping configuration information. After receiving the control channel description list, the second communication node in this embodiment may determine a frequency position of each of the control channels or a frequency position of resources schedulable by each of the control channels according to the frequency hopping configuration information. As can be seen from the present disclosure, frequency selective gains may be obtained when the control channel or the data channel is transmitted. In addition, the frequency hopping configuration information in this embodiment may include one or more of: frequency hopping resources, a frequency hopping interval in frequency domain or a frequency hopping interval in time domain. The design of the above parameters may be implemented by considering wireless channel characteristics including at least one of coherence bandwidth and coherence time.

In an exemplary embodiment, on the basis of each of the above embodiments, the description information of each of the control channel includes, for example, the power control configuration information. The power control configuration information may include one or more of: a downlink transmit power control parameter value, an uplink transmit power control parameter value or an uplink power control mode. For example, the downlink transmit power control parameter value includes downlink transmit power of the first communication node; the uplink transmit power control parameter value includes one or more of a link loss compensation factor, an inter-cell interference factor or a compensation factor; and an uplink power control mode may be a power control method such as an open loop or a closed loop, or a power control formula used by communication nodes.

In an exemplary embodiment, on the basis of each of the above embodiments, the description information of each of the control channel includes, for example, the beam configuration information. The beam configuration information may include one or more of: a number of transmitting beams, a number of receiving beams, a switching period of the transmitting beams, a switching period of the receiving beams or a beam training mode.

The lack of consideration of the "forward compatibility" in the LTE standard design results in an increasingly bigger difficulty for the subsequent standard design, increasingly lower spectrum efficiency and an increase of the system maintenance costs. In the information transmission method according to each of the above embodiments of the present application, it can be seen that as for the configuration content of the control channel description list in each embodiment of the present application, a large range of configuration information may be selected with high integrity in consideration of various application scenarios, different service types and QoS requirements of different service types, etc. Therefore, when application scenarios, service types or QoS requirements change, the configured content of the control channel description list may be updated. This further improves flexibility and fully considers requirements of the "forward compatibility", thereby increasing spectrum efficiency and reducing subsequent system maintenance costs.

It is to be noted that the receiving beams mentioned in the present application include at least one of: a receiving port, receiving resources, a reference signal sequence, a receiving precoding matrix (analog, digital or hybrid matrix), a receiver algorithm or quasi-co-location information. The transmitting beams mentioned in the present application include at least one of: a transmitting port, transmitting resources, a reference signal sequence, a transmitting precoding matrix (analog, digital or hybrid matrix), a transmitter algorithm or quasi-co-location information.

Figure 15:
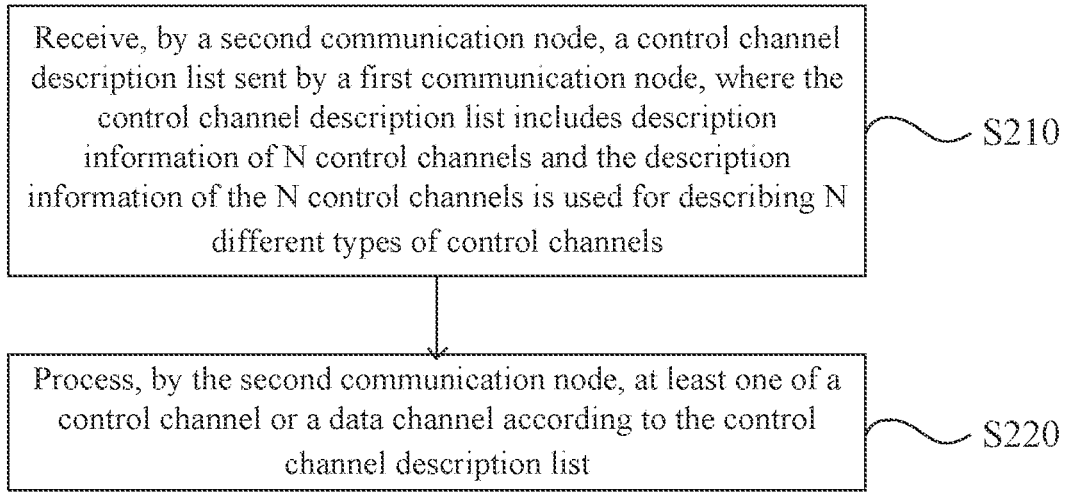
FIG. 15 is a flowchart of another information transmission method according to an embodiment of the present disclosure.

FIG. 15 is a flowchart of another information transmission method according to an embodiment of the present disclosure. The information transmission method of this embodiment is suitable for controlling channels in a 5G system, and may be executed by an information transmission apparatus. The information transmission apparatus is implemented using a combination of hardware and software and the apparatus may be integrated onto a processor of a second communication node for the processor's use. As illustrated in FIG. 15, the information transmission method in the present embodiment may include the steps described below.

In S210, a second communication node receives a control channel description list sent by a first communication node, where the control channel description list includes description information of N control channels and the description information of the N control channels is used for describing N different types of control channels.

The description information of each of the control channels may include one or more of: control channel configuration information, reference signal configuration information, link resource configuration information, operating bandwidth configuration information, puncturing configuration information, frequency hopping configuration formation, transmission time interval length configuration information, power control configuration information or beam configuration information.

The information transmission method provided by the present disclosure designs configuration content of control channels in the 5G system. The configuration content of the control channels in this embodiment may be described by the control channel description list. The second communication node receives the control channel description list sent by the first communication node. The control channel description list includes the description information of the N control channels which describes the N control channels and N is a positive integer in this embodiment. In each embodiment of the present application, frequency domain resources schedulable by any two control channels in the description information of the N control channels may be completely different, partially overlapping or completely overlapping. It may also be referred to the schematic diagram of the control channel description list illustrated in FIG. 2.

It is to be noted that the control channel description list in this embodiment may be generated by the first communication node or may be generated by another communication node and then sent to the first communication node. That is to say, the control channel description list may be generated by the first communication node or another communication node in the 5G network. The another communication node is generally an upper network device with respect to the first communication node.

It is to be noted further that the specific implementation of the configuration content of the control channel description list in each embodiment of the present application has been described in the above embodiments, and therefore will not be repeated in this embodiment.

In S220, the second communication node processes at least one of a control channel or a data channel according to the control channel description list.

In this embodiment, after the first communication node generates or receives the control channel description list, the first communication node may send the control channel description list to the second communication node in the network which communicates with the first communication node. The description information of the N control channels in the control channel description list is used for describing the control of controlling channels between the first communication node and the second communication node and resources used for transmitting uplink and downlink data. That is, the second communication node may process at least one of the control channel or the data channel according to the received control channel description list.

Compared with the single design of control channels in the existing LTE technology, the control channel description list in this embodiment integrates configuration content of multiple control channels, and the integrated content may be selectively integrated into the configuration content according to practical applications. For example, according to different application scenarios, different service types or QoS requirements of different service types, corresponding content is selected to be configured in the control channel description list so that the currently configured control channel description list may satisfy requirements of the communication nodes for the current service.

In the embodiments of the present disclosure, the control channels may be flexibly configured according to service requirements, and the second communication node obtains a configuration situation of the control channels by using the control channel description list and performs subsequent processing operations such as control channel demodulation and data demodulation.

In the information transmission method in this embodiment, the second communication node receives the control channel description list sent by the first communication node and processes at least one of the control channel and the data channel according to the received control channel description list. The control channel description list includes the description information of the N control channels. In this embodiment, the control channel description list may be configured according to service requirements and meet a requirement of flexibly designing control channel configuration content, and the standard scheme of control channels in the 5G system is rationally designed.

In an exemplary embodiment, on the basis of the embodiments of the present disclosure, the control channel description list in this embodiment may further include type information of M types of terminal devices, where M is a positive integer. In a specific implementation, a correspondence between the M types of terminal devices and the description information of the N control channels is that each type of terminal device corresponds to description information of one or more of the control channels. In addition, the description information of each of the N control channels may correspond to one or more types of terminal devices. In this embodiment, the types of terminal devices may be distinguished based on services, computing power or supported standard versions.

Figure 16:
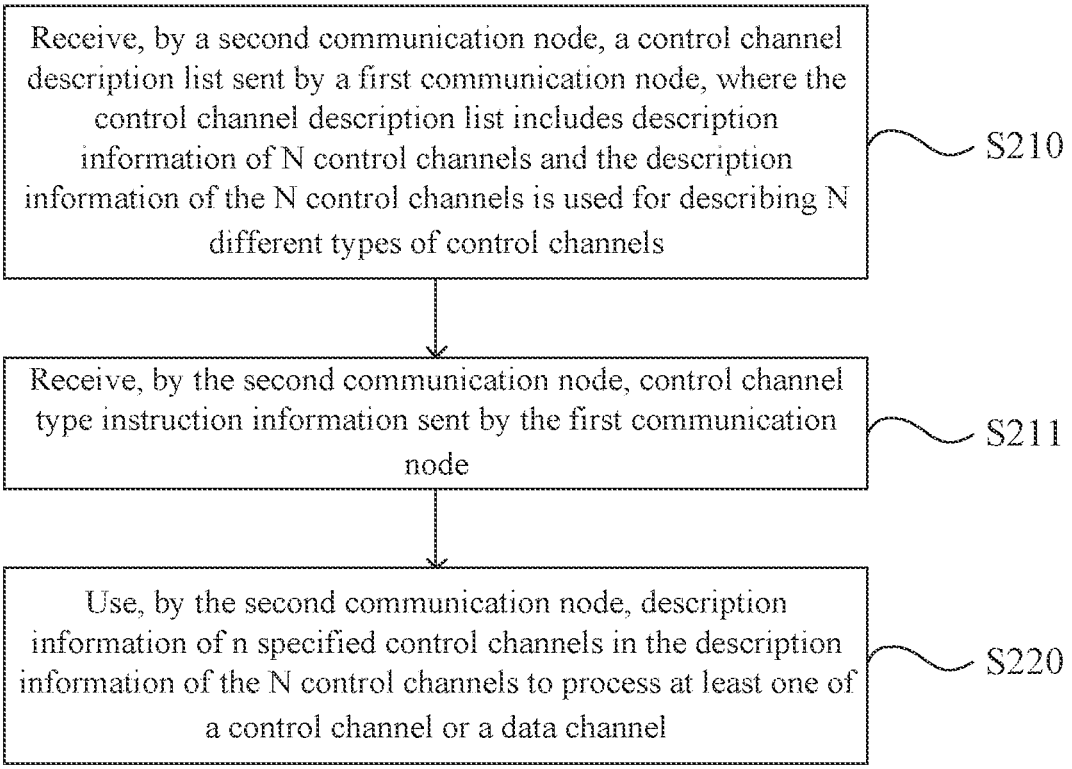
FIG. 16 is a flowchart of another information transmission method according to an embodiment of the present disclosure.

FIG. 16 is a flowchart of another information transmission method according to an embodiment of the present disclosure. On the basis of the embodiment illustrated in FIG. 15, the information transmission method in this embodiment further includes S211 before S220 in which the second communication node processes channels.

In S211, the second communication node receives control channel type instruction information sent by the first communication node. Accordingly, S220 in this embodiment may be implemented as follows: The second communication node uses description information of n specified control channels in the description information of the N control channels to process at least one of the control channel or the data channel.

In this embodiment, the first communication node may not only send the control channel description list to the second communication node but also send the control channel type instruction information to the second communication node, to notify the second communication node of control channels of which the description information is used, which means that n is a positive integer less than or equal to N. In an exemplary embodiment, a length of the control channel type instruction information in this embodiment is determined by the variable N. The specific way of determining the length has been described in the above embodiments and will not be repeated herein.

It is to be noted that this embodiment does not limit the sequence in which the second communication node receives the control channel description list and the control channel type instruction information, that is, this embodiment does not limit the execution order of S210 and S211, as long as the second communication node executed S210 and S211 before the channel processing. The embodiment illustrated in FIG. 16 is shown using an example in which S211 is executed after S210.

Figure 17:
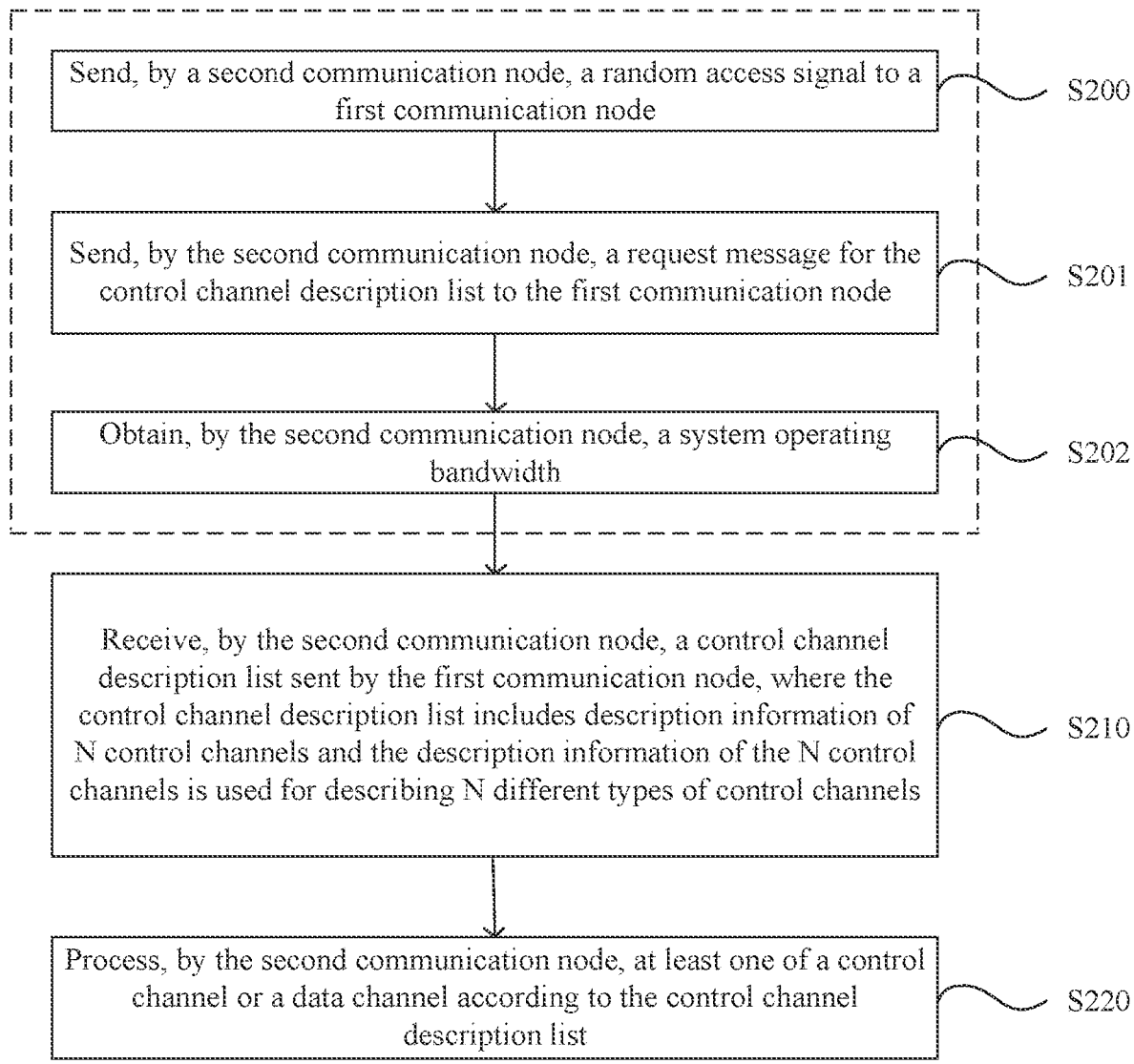
FIG. 17 is a flowchart of another information transmission method according to an embodiment of the present disclosure.

FIG. 17 is a flowchart of another information transmission method according to an embodiment of the present disclosure. On the basis of the embodiment illustrated in FIG. 15, the information transmission method in this embodiment further includes S200 before S210. In S200, the second communication node sends a random access signal to the first communication node.

In an exemplary embodiment, the information transmission method in this embodiment may further include S201 before S210. In S201, the second communication node sends a request message for the control channel description list to the first communication node.

In addition, the information transmission method in this embodiment may further include S202 before S210. In S202, the second communication node obtains a system operating bandwidth.

In a specific implementation of this embodiment, resources for sending the control channel description list is obtained by the first communication node in a contention manner. That is, the first communication node in this embodiment may obtain sending resources in a contention manner and then perform the sending operation after the first communication node determines that the control channel description list needs to be sent.

It is to be noted that in the present embodiment, S200, S201 and S202 may be selectively executed or wholly executed. The embodiment illustrated in FIG. 17 is shown using an example in which S200, S201 and S202 are sequentially executed.

Figure 18:
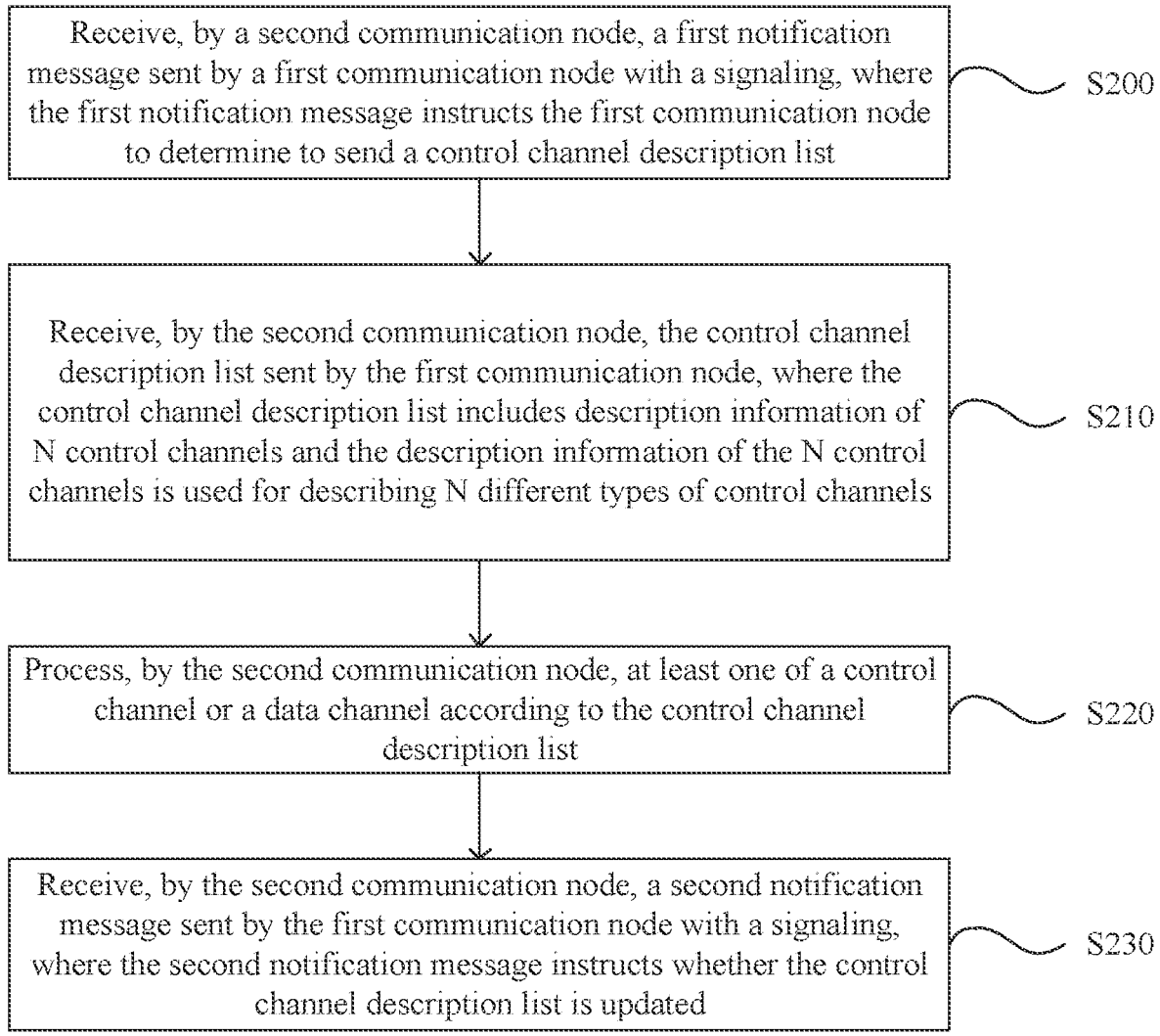
FIG. 18 is a flowchart of another information transmission method according to an embodiment of the present disclosure.

In an exemplary embodiment, on the basis of each of the above embodiments, FIG. 18 shows a flowchart of another information transmission method according to an embodiment of the present disclosure. The information transmission method in this embodiment is shown on the basis of the embodiment illustrated in FIG. 15 and further includes S200 before S210.

In S200, the second communication node receives a first notification message sent by the first communication node with a signaling, where the first notification message instructs the first communication node to determine to send the control channel description list.

In an exemplary embodiment, the information transmission method in this embodiment may further include S230 after S210 or S220.

In S230, the second communication node receives a second notification message sent by the first communication node with a signaling, where the second notification message instructs whether the control channel description list is updated.

The first notification message and the second notification message received by the second communication node in this embodiment may be sent by the first communication node in a unicast or broadcast manner, and the signaling in this embodiment may be carried in a physical broadcasting control channel, for example. Similarly, the second communication node in this embodiment may further receive the resources used for sending the control channel description list and a transmission period of the control channel description list notified by the first communication node with the signaling. The control channel description list in this embodiment may further include transmission period information of the control channel description list, that is, the control channel description list in this embodiment may be periodically sent by the first communication node.

In an exemplary embodiment, the information transmission method in this embodiment may further include that the second communication node receives a synchronization channel sent by the first communication node. Resources used by the first communication node for sending the control channel description list are the same as resources used by the first communication node for sending the synchronization channel.

It is to be noted that each of the control channels in each embodiment of the present application may be sent by the first communication node or another communication node and the first communication node may send the control channel description list at a carrier frequency different from a carrier frequency for sending the N control channels. In addition, in each embodiment of the present application, the second communication node receiving the control channel description list may belong to a set of second communication nodes of a preset type. The set of second communication nodes of the preset type may be a set of second communication nodes supporting machine-type communication, or a set of second communication nodes supporting low-delay high-reliability machine-type communication, or a set of second communication nodes supporting low-rate machine-type communication, or a set of second communication nodes supporting mobile broadband.

Figure 19:
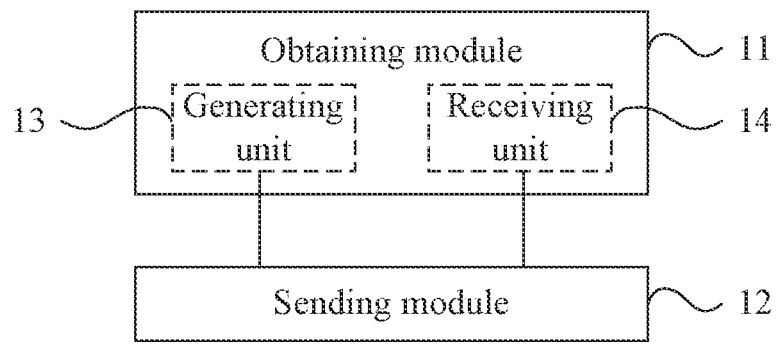
FIG. 19 is a structural diagram of an information transmission apparatus according to an embodiment of the present disclosure.

FIG. 19 is a structural diagram of an information transmission apparatus according to an embodiment of the present disclosure. The information transmission apparatus of this embodiment is suitable for controlling channels in a 5G system. The information transmission apparatus is implemented using a combination of hardware and software and the apparatus may be integrated onto a processor of a first communication node for the processor's use. As illustrated in FIG. 19, the information transmission apparatus of this embodiment includes an obtaining module 11 and a sending module 12.

The obtaining module is configured to generate or receive a control channel description list, where the control channel description list includes description information of N control channels and the description information of the N control channels is used for describing N different types of control channels. The description information of each of the control channels in this embodiment may include one or more of: control channel configuration information, reference signal configuration information, link resource configuration information, operating bandwidth configuration information, puncturing configuration information, frequency hopping configuration formation, transmission time interval length configuration information, power control configuration information or beam configuration information.

The information transmission apparatus provided by the present disclosure designs configuration content of control channels in the 5G system. The configuration content of the control channels in this embodiment may also be described by the control channel description list. The obtaining module 11 generates or receives the control channel description list. The control channel description list includes the description information of the N control channels which describes the N control channels and N is a positive integer in this embodiment. In each embodiment of the present application, frequency domain resources schedulable by any two control channels in the description information of the N control channels may be completely different, partially overlapping or completely overlapping. Completely different frequency domain resources indicate that the frequency domain resources schedulable by any two control channels may be continuous or discrete. It may also be referred to the schematic diagram of the control channel description list illustrated in FIG. 2.

It is to be noted that the obtaining module 11 in this embodiment may include a generating unit 13 or a receiving unit 14. Accordingly, the generating unit 13 is configured to generate the control channel description list and the receiving unit 14 is configured to receive the control channel description list sent by another communication node. That is to say, the control channel description list may be generated by the generating 13 in the first communication node or another communication node in the 5G network. The another communication node is generally an upper network device with respect to the first communication node.

It is to be noted further that the specific implementation of the configuration content of the control channel description list in each embodiment of the present application has been described in the above embodiments, and therefore will not be repeated in this embodiment.

The sending module 12 is connected to the obtaining module 11 and is configured to send the control channel description list obtained by the obtaining module 11 to a second communication node.

In this embodiment, after the obtaining module 11 generates or receives the control channel description list, the sending module 12 may send the control channel description list to the second communication node in the network which communicates with the first communication node. The description information of the N control channels in the control channel description list is used for describing the control of controlling channels between the first communication node and the second communication node and resources used for transmitting uplink and downlink data. That is, the second communication node may process at least one of a control channel or a data channel according to the received control channel description list.

The information transmission apparatus according to the embodiments of the present disclosure is used for executing the information transmission method according to the embodiment illustrated in FIG. 1 and thus has corresponding functional modules, having similar principles of implementation and technical results which will not be repeated here.

In an exemplary embodiment, on the basis of the embodiments of the present disclosure, the control channel description list in this embodiment may further include type information of M types of terminal devices, where M is a positive integer. In a specific implementation, a correspondence between the M types of terminal devices and the description information of the N control channels is that each type of terminal device corresponds to description information of one or more of the control channels. In addition, the description information of each of the N control channels may correspond to one or more types of terminal devices. In this embodiment, the types of terminal devices may be distinguished based on services, computing power or supported standard versions.

On the basis of the embodiment illustrated in FIG. 19, in the information transmission apparatus according to this embodiment, the sending module 12 may be further configured to send control channel type instruction information to the second communication node. The control channel type instruction information is used for instructing the second communication node to use description information of n specified control channels in the description information of the N control channels to process at least one of the control channel or the data channel.

In this embodiment, the sending module 12 may not only send the control channel description list to the second communication node but also send the control channel type instruction information to the second communication node, to notify the second communication node of control channels of which the description information is used, which means that n is a positive integer less than or equal to N. In an exemplary embodiment, a length of the control channel type instruction information in this embodiment is determined by the variable N. The specific way of determining the length has been described in the above embodiments and will not be repeated herein.

It is to be noted that this embodiment does not limit the sequence in which the sending module 12 sends the control channel description list and the control channel type instruction information.

The information transmission apparatus according to the embodiments of the present disclosure is used for executing the information transmission method according to the embodiment illustrated in FIG. 3 and thus has corresponding functional modules, having similar principles of implementation and technical results which will not be repeated here.

Figure 20:
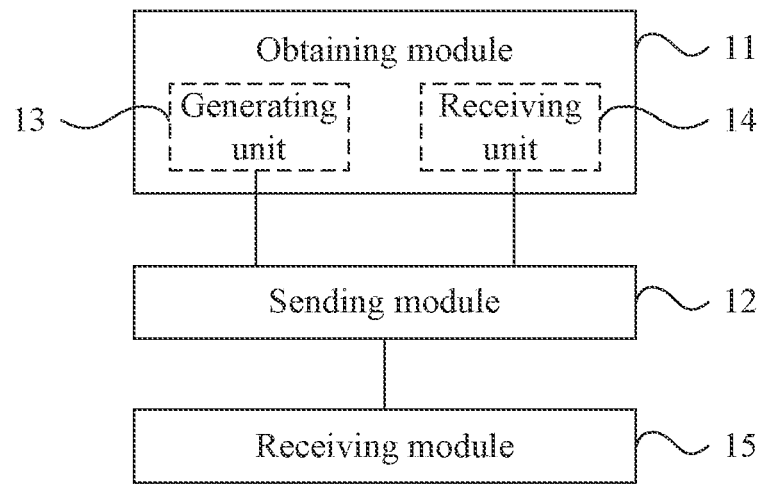
FIG. 20 is a structural diagram of another information transmission apparatus according to an embodiment of the present disclosure.

FIG. 20 is a structural diagram of another information transmission apparatus according to an embodiment of the present disclosure. On the basis of the embodiment illustrated in FIG. 19, the information transmission apparatus according to this embodiment further includes a receiving module 15 connected to the sending module 12. The receiving module 15 is configured to receive a random access signal sent by the second communication node or receive a request message for the control channel description list sent by the second communication node before the sending module 12 sends the control channel description list to the second communication node.

In a specific implementation of this embodiment, the obtaining module 11 may be further configured to obtain resources for sending the control channel description list in a contention manner before the sending module 12 sends the control channel description list to the second communication node. That is, after the first communication node in this embodiment determines that the control channel description list needs to be sent, the obtaining module 11 may obtain sending resources in the contention manner and then the sending module 12 perform the sending operation.

The information transmission apparatus according to the embodiments of the present disclosure is used for executing the information transmission method according to the embodiment illustrated in FIG. 4 and thus has corresponding functional modules, having similar principles of implementation and technical results which will not be repeated here.

In an exemplary embodiment, in the information transmission apparatuses illustrated in FIGS. 19 and 20, the sending module 12 in this embodiment may be further configured to send a first notification message to the second communication node with a signaling before the sending module 12 sends the control channel description list to the second communication node, where the first notification message instructs the first communication node to determine to send the control channel description list.

In a specific implementation of this embodiment, the sending module 12 may be further configured to send a second notification message to the second communication node with a signaling after the sending module 12 sends the control channel description list to the second communication node, where the second notification message instructs whether the control channel description list is updated.

The sending module 12 in this embodiment may send the first notification message and the second notification message in a unicast or broadcast manner, and the signaling in this embodiment may be carried in a physical broadcasting control channel, for example. Similarly, the sending module 12 in this embodiment may further notify the second communication node of the resources used for sending the control channel description list and a transmission period of the control channel description list with the signaling. The control channel description list in this embodiment may further include transmission period information of the control channel description list, that is, the control channel description list in this embodiment may be periodically sent by the first communication node.

In an exemplary embodiment, the sending module 12 in this embodiment may be further configured to send a synchronization channel to the second communication node. Resources used by the sending module 12 for sending the control channel description list are the same as resources used by the sending module 12 for sending the synchronization channel.

The information transmission apparatus according to the embodiments of the present disclosure is used for executing the information transmission method according to the embodiment illustrated in FIG. 5 and thus has corresponding functional modules, having similar principles of implementation and technical results which will not be repeated here.

It is to be noted that each of the control channels in each embodiment of the present application may be sent by the sending module 12 in the first communication node or sent by another communication node and the sending module 12 in the first communication node may send the control channel description list at a carrier frequency different from a carrier frequency for sending the N control channels. In addition, in each embodiment of the present application, the second communication node receiving the control channel description list may belong to a set of second communication nodes of a preset type. The set of second communication nodes of the preset type may be a set of second communication nodes supporting machine-type communication, or a set of second communication nodes supporting low-delay high-reliability machine-type communication, or a set of second communication nodes supporting low-rate machine-type communication, or a set of second communication nodes supporting mobile broadband.

In a specific implementation, the sending module 12, the receiving module 15 and the receiving unit 14 of the obtaining module 11 in the embodiments illustrated by FIGS. 19 and 20 may be implemented by a transceiver of the first communication node. The generating unit 13 of the obtaining module 11 may be implemented by a processor of the first communication node, and the processor may be, for example, a Central Processing Unit (CPU), or an Application Specific Integrated Circuit (ASIC), or one or more integrated circuits used for implementing the embodiments of the present disclosure.

Figure 21:
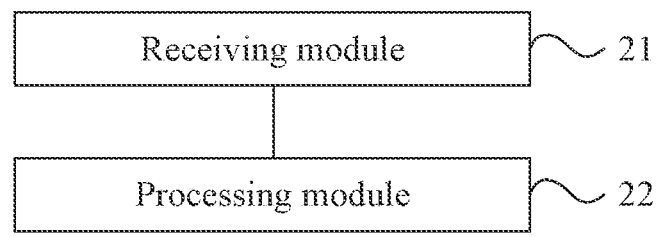
FIG. 21 is a structural diagram of another information transmission apparatus according to an embodiment of the present disclosure.

FIG. 21 is a structural diagram of another information transmission apparatus according to an embodiment of the present disclosure. The information transmission apparatus in this embodiment is suitable for controlling channels in a 5G system. The information transmission apparatus is implemented using a combination of hardware and software and the apparatus may be integrated onto a processor of a second communication node for the processor's use. As illustrated in FIG. 21, the information transmission apparatus of this embodiment includes a receiving module 21 and a processing module 22.

The receiving module 21 is configured to receive a control channel description list sent by a first communication node, where the control channel description list includes description information of N control channels and the description information of the N control channels is used for describing N different types of control channels. The description information of each of the control channels in this embodiment may include one or more of: control channel configuration information, reference signal configuration information, link resource configuration information, operating bandwidth configuration information, puncturing configuration information, frequency hopping configuration formation, transmission time interval length configuration information, power control configuration information or beam configuration information.

The information transmission apparatus provided by the present disclosure designs configuration content of control channels in the 5G system. The configuration content of the control channels in this embodiment may be described by the control channel description list. The receiving module 21 receives the control channel description list sent by the first communication node. The control channel description list includes the description information of the N control channels which describes the N control channels and N is a positive integer in this embodiment. In each embodiment of the present application, frequency domain resources schedulable by any two control channels in the description information of the N control channels may be completely different, partially overlapping or completely overlapping. It may also be referred to the schematic diagram of the control channel description list illustrated in FIG. 2.

It is to be noted that the control channel description list in this embodiment may be generated by the first communication node or generated by another communication node and then sent to the first communication node. That is to say, the control channel description list may be generated by the first communication node or another communication node in the 5G network. The another communication node is generally an upper network device with respect to the first communication node.

It is to be noted further that the specific implementation of the configuration content of the control channel description list in each embodiment of the present application has been described in the above embodiments, and therefore will not be repeated in this embodiment.

The processing module 22 connected to the receiving module 21 is configured to process at least one of a control channel or a data channel according to the control channel description list received by the receiving module 21.

In this embodiment, after the first communication node generates or receives the control channel description list, the first communication node may send the control channel description list to the second communication node in the network which communicates with the first communication node. The description information of the N control channels in the control channel description list is used for describing the control of controlling channels between the first communication node and the second communication node and resources used for transmitting uplink and downlink data. That is, the processing module 22 may process at least one of the control channel or the data channel according to the received control channel description list.

The information transmission apparatus according to the embodiments of the present disclosure is used for executing the information transmission method according to the embodiment illustrated in FIG. 15 and thus has corresponding functional modules, having similar principles of implementation and technical results which will not be repeated here.

In an exemplary embodiment, on the basis of the embodiments of the present disclosure, the control channel description list in this embodiment may further include type information of M types of terminal devices, where M is a positive integer. In a specific implementation, a correspondence between the M types of terminal devices and the description information of the N control channels is that each type of terminal device corresponds to description information of one or more of the control channels. In addition, the description information of each of the N control channels may correspond to one or more types of terminal devices. In this embodiment, the types of terminal devices may be distinguished based on services, computing power or supported standard versions.

On the basis of the embodiment illustrated in FIG. 21, in the information transmission apparatus according to this embodiment, the receiving module 21 may be further configured to receive control channel type instruction information sent by the first communication node before the processing module 22 processes at least one of the control channel or the data channel according to the control channel description list received by the receiving module 21. Accordingly, in this embodiment, the processing module 22 may process at least one of the control channel or the data channel by: using description information of n specified control channels in the description information of the N control channels to process at least one of the control channel or the data channel.

In this embodiment, the first communication node may not only send the control channel description list to the second communication node but also send the control channel type instruction information to the second communication node, to notify the second communication node of control channels of which the description information is used, which means that n is a positive integer less than or equal to N. In an exemplary embodiment, a length of the control channel type instruction information in this embodiment is determined by the variable N. The specific way of determining the length has been described in the above embodiments and will not be repeated herein.

It is to be noted that this embodiment does not limit the sequence in which the receiving module 21 receives the control channel description list and the control channel type instruction information, as long as the receiving operation is executed before the processing module 22 processes channels.

The information transmission apparatus according to the embodiments of the present disclosure is used for executing the information transmission method according to the embodiment illustrated in FIG. 16 and thus has corresponding functional modules, having similar principles of implementation and technical results which will not be repeated here.

Figure 22:
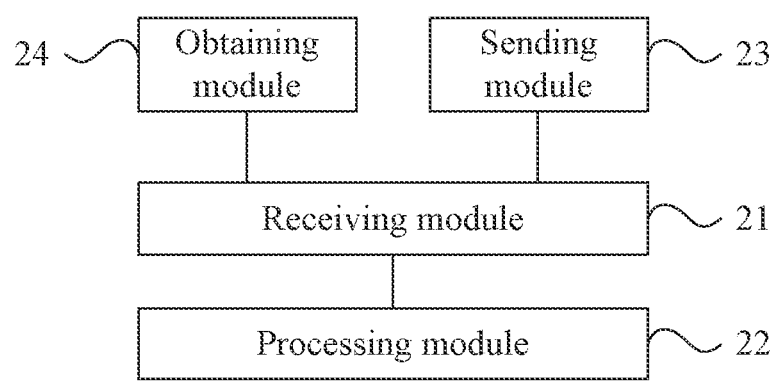
FIG. 22 is a structural diagram of another information transmission apparatus according to an embodiment of the present disclosure.

FIG. 22 is a structural diagram of another information transmission apparatus according to an embodiment of the present disclosure. On the basis of the embodiment illustrated in FIG. 21, the information transmission apparatus according to this embodiment further includes a sending module 23 connected to the receiving module 21. The sending module 23 is configured to send a random access signal to the first communication node or send a request message for the control channel description list to the first communication node before the receiving module 21 receives the control channel description list sent by the first communication node.

In addition, the information transmission apparatus according to this embodiment may further include an obtaining module 24 connected to the receiving module 21. The obtaining module 24 is configured to obtain a system operating bandwidth before the receiving module 21 receives the control channel description list sent by the first communication node.

In a specific implementation of this embodiment, resources for sending the control channel description list is obtained by the first communication node in a contention manner. That is, the first communication node in this embodiment may obtain sending resources in a contention manner and then perform the sending operation after the first communication node determines that the control channel description list needs to be sent.

The information transmission apparatus according to the embodiments of the present disclosure is used for executing the information transmission method according to the embodiment illustrated in FIG. 17 and thus has corresponding functional modules, having similar principles of implementation and technical results which will not be repeated here.

In an exemplary embodiment, on the basis of the embodiments illustrated in FIGS. 21 and 22, in the information transmission apparatus according to this embodiment, the receiving module 21 may be further configured to, before the receiving module 21 receives the control channel description list sent by the first communication node, receive a first notification message send by the first communication node with a signaling, where the first notification message instructs the first communication node to determine to send the control channel description list; or receive a second notification message sent by the first communication node with a signaling, where the second notification message instructs whether the control channel description list is updated.

The first notification message and the second notification message received by the receiving module 21 in this embodiment may be sent by the first communication node in a unicast or broadcast manner, and the signaling in this embodiment may be carried in a physical broadcasting control channel, for example. Similarly, the receiving module 21 in this embodiment may be further configured to receive the resources used for sending the control channel description list and a transmission period of the control channel description list notified by the first communication node with the signaling. The control channel description list in this embodiment may further include transmission period information of the control channel description list, that is, the control channel description list in this embodiment may be periodically sent by the first communication node.

In an exemplary embodiment, in the information transmission apparatus according to this embodiment, the receiving module 21 may be further configured to receive a synchronization channel sent by the first communication node. Resources used by the first communication node for sending the control channel description list are the same as resources used by the first communication node for sending the synchronization channel.

It is to be noted that each of the control channels in each embodiment of the present application may be sent by the first communication node or another communication node and the first communication node may send the control channel description list at a carrier frequency different from a carrier frequency for sending the N control channels. In addition, in each embodiment of the present application, the second communication node in which the receiving module 21 is disposed may belong to a set of second communication nodes of a preset type. The set of second communication nodes of the preset type may be a set of second communication nodes supporting machine-type communication, or a set of second communication nodes supporting low-delay high-reliability machine-type communication, or a set of second communication nodes supporting low-rate machine-type communication, or a set of second communication nodes supporting mobile broadband.

The information transmission apparatus according to the embodiments of the present disclosure is used for executing the information transmission method according to the embodiment illustrated in FIG. 18 and thus has corresponding functional modules, having similar principles of implementation and technical results which will not be repeated here.

In a specific implementation, the receiving module 21 and the sending module 23 in the embodiments illustrated by FIGS. 21 and 22 may be implemented by a transceiver of the second communication node. The processing module 22 and the obtaining module 24 may be implemented by a processor of the second communication node, and the processor may be, for example, a CPU, or an ASIC, or one or more integrated circuits used for implementing the embodiments of the present disclosure.

Figure 23:
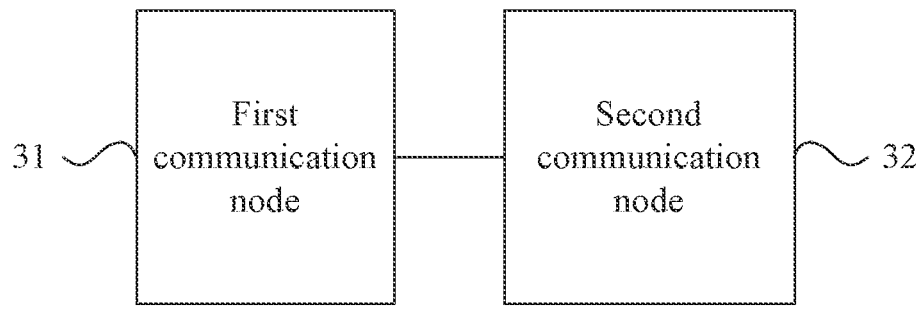
FIG. 23 is a structural diagram of an information transmission system according to an embodiment of the present disclosure.

FIG. 23 is a structural diagram of an information transmission system according to an embodiment of the present disclosure. The information transmission system in this embodiment is suitable for controlling channels in a 5G system. The information transmission system includes a first communication node 31 and a second communication node 32 connected to the first communication node 31. The first communication node 31 is provided with the information transmission apparatus in the embodiment illustrated in FIG. 19 or 20. The second communication node 32 is provided with the information transmission apparatus in the embodiment illustrated in FIG. 21 or 22.

It is to be noted that in this embodiment, the second communication node may belong to a set of second communication nodes of a preset type. The set of second communication nodes of the preset type may be a set of second communication nodes supporting machine-type communication, or a set of second communication nodes supporting low-delay high-reliability machine-type communication, or a set of second communication nodes supporting low-rate machine-type communication, or a set of second communication nodes supporting mobile broadband. In addition, in the data transmission system of this embodiment, each network element implements information transmission in the same manner as the corresponding network elements in the embodiments illustrated in FIGS. 19 to 22, and in the same way executes the information transmission method according to any one of the embodiments illustrated by FIGS. 1 to 18, and thus has corresponding functional modules, having similar principles of implementation and technical results which will not be repeated here.

In addition, an embodiment of the present disclosure further provides a computer-readable storage medium configured to store computer-executable instructions for executing the information transmission method according to any embodiment illustrated in FIGS. 1 to 18 when executed by a processor.

It will be understood by those skilled in the art that functional modules/units in all or part of the steps of the method, the system and the apparatus disclosed above may be implemented as software, firmware, hardware and appropriate combinations thereof. In the hardware implementation, the division of functional modules/units mentioned in the above description may not correspond to the division of physical units. For example, one physical component may have several functions, or one function or step may be executed jointly by several physical components. Some or all components may be implemented as software executed by processors such as digital signal processors or microprocessors, hardware, or integrated circuits such as application specific integrated circuits. Such software may be distributed on computer-readable media, which may include computer storage media (non-transitory media) and communication media (transitory media). As is known to those skilled in the art, the term, computer storage media, includes volatile and nonvolatile, removable and non-removable media implemented in any method or technology for storing information (such as computer-readable instructions, data structures, program modules or other data). The computer storage media include, but are not limited to, RAM, ROM, EEPROM, flash memory or other memory technologies, CD-ROM, digital versatile disc (DVD), or other optical disc storage, magnetic cassette, magnetic tape, magnetic disk storage or other magnetic storage devices, or any other media used for storing desired information and accessible by the computer. In addition, as is known to those skilled in the art, communication media generally include computer-readable instructions, data structures, program modules or other data in modulated data signals such as carriers or other transmission mechanisms, and may include any information delivery media.

Although the embodiments disclosed by the present application are as described above, the content thereof is merely embodiments for facilitating the understanding of the present application and is not intended to limit the present application. Any person skilled in the art to which the present application pertains may make any modifications and changes in the forms and details of the implementation without departing from the spirit and scope disclosed by the present application, but the patent protection scope of the present application is still subject to the scope defined by the appended claims.

INDUSTRIAL APPLICABILITY

The information method, apparatus and system provided by the embodiments of the present application meet a requirement of flexibly designing control channel configuration content, and a standard scheme of control channels in the 5G system is rationally designed.

What is claimed is:

1. An information transmission method, comprising:
generating or receiving, by a first communication node, a control channel description list, wherein the control channel description list comprises description information of N control channels and the description information of the N control channels is used for describing N different types of control channels, and N is a positive integer; and
sending, by the first communication node, the control channel description list to a second communication node;
wherein the description information of the control channels comprises control channel configuration information and further comprises at least one of: power control configuration information or beam configuration information;
wherein the control channel configuration information comprises synchronization channel configuration information, wherein the synchronization channel configuration information comprises one or more of: a transmission period, a resource mapping manner or a synchronization sequence; and
wherein before the sending, by the first communication node, the control channel description list to the second communication node, the information transmission method further comprises:
receiving, by the first communication node, a request message for the control channel description list sent by the second communication node.

2. The information transmission method according to claim 1, wherein the power control configuration information comprises one or more of: a downlink transmit power control parameter value, an uplink transmit power control parameter value or an uplink power control mode; or the beam configuration information comprises one or more of: a number of transmitting beams, a number of receiving beams, a switching period of the transmitting beams, a switching period of the receiving beams or a beam training mode;
wherein the description information of the control channels further comprises at least one of: reference signal configuration information, link resource configuration information, operating bandwidth configuration information, puncturing configuration information, frequency hopping configuration formation, or transmission time interval length configuration information,
wherein the reference signal configuration information comprises one or more of: a resource location, a sequence set or a measurement window,
wherein the link resource configuration information comprises one or more of: a number of each of the control channels in a transmission time interval corresponding to the each of the control channels, or a transmission direction of each of the control channels,
wherein the transmission time interval length configuration information comprises a time length corresponding to each of the control channels,
wherein the puncturing configuration information is used for instructing the second communication node whether to decode with information on resources used for transmitting X control channels when data transmission resources used by the second communication node comprise resources for transmitting Y control channels, wherein the X control channels belong to the Y control channels, X is a positive integer less than or equal to N, and Y is a positive integer greater than or equal to X and less than or equal to N; or
the frequency hopping configuration information comprises one or more of: frequency hopping resources, a frequency hopping interval in frequency domain or a frequency hopping interval in time domain.

3. The information transmission method according to claim 2, wherein the control channel configuration information further comprises one or more of: a resource location, a waveform, a transmission period, a valid time length, a resource mapping manner, a spreading code word, a modulation and coding mode, a code rate, a multi-antenna transmission mode, a number of repetitions or a repetition period; wherein the resource location comprises at least one of: a starting resource location or an ending resource location.

4. The information transmission method according to claim 2, wherein the control channel configuration information comprises one or more of: broadcast channel configuration information, access parameter configuration information, resource allocation channel configuration information or feedback channel configuration information,
wherein the broadcast channel configuration information comprises one or more of: the resource location, the transmission period, the resource mapping manner, a valid information length or an information type; or
the access parameter configuration information comprises one or more of: the resource location, the transmission period, the resource mapping manner or an access sequence set; or
the resource allocation channel configuration information is used for instructing a frequency domain range of schedulable data resources by each of the control channels; or
the feedback channel configuration information comprises one or more of: a feedback interval for an acknowledgement or a negative acknowledgement (ACK/NACK), or a channel state information feedback mode.

5. The information transmission method according to claim 1, wherein the control channel description list further comprises transmission period information of the control channel description list.

6. A non-transitory computer-readable storage medium, having stored thereon instructions which, when executed by a processor, cause the processor to perform the information transmission method of claim 1.

7. An information transmission method, comprising:
receiving, by a second communication node, a control channel description list sent by a first communication node, wherein the control channel description list comprises description information of N control channels and the description information of the N control channels is used for describing N different types of control channels, and N is a positive integer; and
processing, by the second communication node, at least one of a control channel or a data channel according to the control channel description list;
wherein the description information of the control channels comprises control channel configuration information and further comprises at least one of: power control configuration information or beam configuration information;
wherein the control channel configuration information comprises synchronization channel configuration information, wherein the synchronization channel configuration information comprises one or more of: a transmission period, a resource mapping manner or a synchronization sequence; and
wherein before the receiving, by the second communication node, the control channel description list sent by the first communication node, the information transmission method further comprises:
sending, by the second communication node, a request message for the control channel description list to the first communication node.

8. The information transmission method according to claim 7, wherein the power control configuration information comprises one or more of: a downlink transmit power control parameter value, an uplink transmit power control parameter value or an uplink power control mode; or the beam configuration information comprises one or more of: a number of transmitting beams, a number of receiving beams, a switching period of the transmitting beams, a switching period of the receiving beams or a beam training mode;
  wherein the description information of the control channels further comprises one or more of: reference signal configuration information, link resource configuration information, operating bandwidth configuration information, puncturing configuration information, frequency hopping configuration formation, or transmission time interval length configuration information,
  wherein the reference signal configuration information comprises one or more of: a resource location, a sequence set or a measurement window; or
  the link resource configuration information comprises one or more of: a number of each of the control channels in a transmission time interval or a transmission direction of each of the control channels; or
  the puncturing configuration information is used for instructing the second communication node whether to decode with information on resources used for transmitting X control channels when data transmission resources used by the second communication node comprise resources for transmitting Y control channels, wherein the X control channels belong to the Y control channels, X is a positive integer less than or equal to N, and Y is a positive integer greater than or equal to X and less than or equal to N; or
  the frequency hopping configuration information comprises one or more of: frequency hopping resources, a frequency hopping interval in frequency domain or a frequency hopping interval in time domain.

9. The information transmission method according to claim 8, wherein the control channel configuration information further comprises one or more of: a resource location, a waveform, a transmission period, a valid time length, a resource mapping manner, a spreading code word, a modulation and coding mode, a code rate, a multi-antenna transmission mode, a number of repetitions or a repetition period; wherein the resource location comprises at least one of: a starting resource location or an ending resource location.

10. The information transmission method according to claim 8, wherein the control channel configuration information comprises one or more of: broadcast channel configuration information, access parameter configuration information, resource allocation channel configuration information or feedback channel configuration information;
  wherein the broadcast channel configuration information comprises one or more of: the resource location, the transmission period, the resource mapping manner, a valid information length or an information type; or
  the access parameter configuration information comprises one or more of: the resource location, the transmission period, the resource mapping manner or an access sequence set; or
  the resource allocation channel configuration information is used for instructing a frequency domain range of schedulable data resources by each of the control channels; or
  the feedback channel configuration information comprises one or more of: a feedback interval for an acknowledgement or a negative acknowledgement (ACK/NACK), or a channel state information feedback mode.

11. The information transmission method according to claim 7, wherein the control channel description list further comprises transmission period information of the control channel description list.

12. An information transmission apparatus, disposed in a second communication node, comprising:
  a processor; and
  a memory for storing instructions executable by the processor,
  wherein the instructions are configured to, when executed by the processor, implement the information transmission method of claim 7.

13. The information transmission apparatus according to claim 12, wherein the power control configuration information comprises one or more of: a downlink transmit power control parameter value, an uplink transmit power control parameter value or an uplink power control mode; or the beam configuration information comprises one or more of: a number of transmitting beams, a number of receiving beams, a switching period of the transmitting beams, a switching period of the receiving beams or a beam training mode;
  wherein the description information of the control channels further comprises one or more of: reference signal configuration information, link resource configuration information, operating bandwidth configuration information, puncturing configuration information, frequency hopping configuration formation, or transmission time interval length configuration information.

14. The information transmission apparatus according to claim 13, wherein the control channel configuration information further comprises one or more of: a resource location, a waveform, a transmission period, a valid time length, a resource mapping manner, a spreading code word, a modulation and coding mode, a code rate, a multi-antenna transmission mode, a number of repetitions or a repetition period; wherein the resource location comprises at least one of: a starting resource location or an ending resource location; or
  the control channel configuration information comprises one or more of: broadcast channel configuration information, access parameter configuration information, resource allocation channel configuration information or feedback channel configuration information.

15. A non-transitory computer-readable storage medium, having stored thereon instructions which, when executed by a processor, cause the processor to perform the information transmission method of claim 7.

16. An information transmission apparatus, disposed in a first communication node, comprising:
  a processor; and
  a memory for storing instructions executable by the processor,
  wherein the processor is configured to:
  generate or receive a control channel description list, wherein the control channel description list comprises description information of N control channels and the description information of the N control channels is used for describing N different types of control channels, and N is a positive integer; and
  send the control channel description list to a second communication node;
  wherein the description information of the control channels comprises control channel configuration information and further comprises at least one of: power control configuration information or beam configuration information;
  wherein the control channel configuration information comprises synchronization channel configuration information, wherein the synchronization channel configuration information comprises one or more of: a transmission period, a resource mapping manner or a synchronization sequence; and wherein the processor is further configured to receive a request message for the control channel description list sent by the second communication node before sending the control channel description list to the second communication node.

17. The information transmission apparatus according to claim 16, wherein the power control configuration information comprises one or more of: a downlink transmit power control parameter value, an uplink transmit power control parameter value or an uplink power control mode; or the beam configuration information comprises one or more of: a number of transmitting beams, a number of receiving beams, a switching period of the transmitting beams, a switching period of the receiving beams or a beam training mode;

wherein the description information of the control channels further comprises one or more of: reference signal configuration information, link resource configuration information, operating bandwidth configuration information, puncturing configuration information, frequency hopping configuration formation, or transmission time interval length configuration information.

18. The information transmission apparatus according to claim 17, wherein the control channel configuration information further comprises one or more of: a resource location, a waveform, a transmission period, a valid time length, a resource mapping manner, a spreading code word, a modulation and coding mode, a code rate, a multi-antenna transmission mode, a number of repetitions or a repetition period; wherein the resource location comprises at least one of: a starting resource location or an ending resource location; or the control channel configuration information comprises one or more of: broadcast channel configuration information, access parameter configuration information, resource allocation channel configuration information or feedback channel configuration information.

* * * * *